(12) United States Patent
Lombardi et al.

(10) Patent No.: US 11,989,846 B2
(45) Date of Patent: May 21, 2024

(54) MIXTURE OF VOLUMETRIC PRIMITIVES FOR EFFICIENT NEURAL RENDERING

(71) Applicant: Meta Platforms Technologies, LLC, Menlo Park, CA (US)

(72) Inventors: Stephen Anthony Lombardi, Pittsburgh, PA (US); Tomas Simon Kreuz, Pittsburgh, PA (US); Jason Saragih, Pittsburgh, PA (US); Gabriel Bailowitz Schwartz, Seattle, WA (US); Michael Zollhoefer, Pittsburgh, PA (US); Yaser Sheikh, Pittsburgh, PA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 163 days.

(21) Appl. No.: 17/554,992

(22) Filed: Dec. 17, 2021

(65) Prior Publication Data
US 2022/0245910 A1   Aug. 4, 2022

Related U.S. Application Data

(60) Provisional application No. 63/141,862, filed on Jan. 26, 2021.

(51) Int. Cl.
*G06T 19/20* (2011.01)
*G06T 15/06* (2011.01)
*G06T 17/20* (2006.01)

(52) U.S. Cl.
CPC .............. *G06T 19/20* (2013.01); *G06T 15/06* (2013.01); *G06T 17/20* (2013.01); *G06T 2219/2012* (2013.01)

(58) Field of Classification Search
CPC .......... G06T 19/20; G06T 17/20; G06T 15/06; G06T 2219/2012
See application file for complete search history.

(56) References Cited

U.S. PATENT DOCUMENTS

2018/0158249 A1*  6/2018  Kinstner ................ G06F 3/012
2018/0190034 A1*  7/2018  Shapira .................. G06F 3/011
2019/0378341 A1* 12/2019  Xie ........................ G06T 15/04

OTHER PUBLICATIONS

US/RO—Invitation to Pay Additional Fees for International Application No. PCT/US2022/012532 dated May 25, 2022, 17 pages.
(Continued)

*Primary Examiner* — Michelle Chin
(74) *Attorney, Agent, or Firm* — McDermott Will & Emery LLP

(57) ABSTRACT

A method for training a real-time, modeling for animating an avatar for a subject is provided. The method includes collecting multiple images of a subject. The method also includes selecting a plurality of vertex positions in a guide mesh, indicative of a volumetric primitive enveloping the subject, determining a geometric attribute for the volumetric primitive including a position, a rotation, and a scale factor of the volumetric primitive, determining a payload attribute for each of the volumetric primitive, the payload attribute including a color value and an opacity value for each voxel in a voxel grid defining the volumetric primitive, determining a loss factor for each point in the volumetric primitive based on the geometric attribute, the payload attribute and a ground truth value, and updating a three-dimensional model for the subject. A system and a non-transitory, computer-readable medium storing instructions to perform the above method are also provided.

20 Claims, 14 Drawing Sheets

(56) References Cited

OTHER PUBLICATIONS

Knoblauch D., et al., "Region-of-Interest Volumetric Visual Hull Refinement," ACM Symposium on Virtual Reality Software and Technology, Nov. 22, 2010, pp. 143-150.
Lombardi S., et al., "Mixture of Volumetric Primitives for Efficient Neural Rendering," ArXiv.org, 2021, vol. 40, No. 4, 13 pages.
Riegler G., et al., "Free View Synthesis," European Conference on Computer Vision (ECCV), 2020, pp. 623-640.
Wald I., et al., "Distributed Interactive Ray Tracing of Dynamic Scenes," Parallel and Large-Data Visualization and Graphics, Oct. 20, 2003, 9 pages.
US/RO—International Search Report and Written Opinion for International Application No. PCT/US2022/012532 dated Jul. 18, 2022, 22 pages.
Tulsiani S., et al., "Multi-View Supervision for Single-View Reconstruction via Differentiable Ray Consistency," arxiv.org, University of California, Berkeley, Apr. 20, 2017, 13 pages, XP080764388.
Valentin J., et al., "TensorFlow Graphics: Computer Graphics Meets Deep Learning," 2019, 8 pages.
Wiles O., et al., "SynSin: End-to-End View Synthesis From a Single Image," Computer Vision and Pattern Recognition (CVPR), 2020, pp. 7467-7477.
Wu J., et al., "Learning a Probabilistic Latent Space of Object Shapes via 3D Generative-adversarial Modelling," In Advances in neural information processing systems, 2016, pp. 82-90.
Xian W., et al., "Space-time Neural Irradiance Fields for Free-Viewpoint Video," arXiv:2011.12950, 2020, 10 pages.
Yifan W., et al., "Differentiable Surface Splatting for Point-based Geometry Processing," ACMTransactions on Graphics, 2019, vol. 38, No. 6, pp. 1-14.
Yu A., et al., "pixelNeRF: Neural Radiance Fields from One or Few Images," arXiv, 2020, 20 pages, https://arxiv.org/abs/2012.02190.
Zhou T., et al., "Stereo Magnification: Learning View Synthesis using Multiplane Images," ACM Transactions Graph, Aug. 2018, vol. 37 (4), Article 65, pp. 65:1-65:12.
Choy C.B., et al., "3D-R2N2: A Unified Approach for Single and Multi-View 3D Object Reconstruction," In European conference on computer vision, Springer, 2016, pp. 628-644.
Du Y., et al., "Neural Radiance Flow for 4D View Synthesis and Video Processing," arXiv:2012.09790, 2020, 14 pages.
Gafni G., et al., "Dynamic Neural Radiance Fields for Monocular 4D Facial Avatar Reconstruction," 2020, 11 pages, Retrieved from Internet: URL: https://arxiv.org/abs/2012.03065.
Gao C., et al., "Portrait Neural Radiance Fields from a Single Image," 2020, 10 pages, Retrieved from Internet: URL: https://arxiv.org/abs/2012.05903.
Genova K., et al., "Local Deep Implicit Functions for 3D Shape," In Proceedings of the IEEE/CVF Conference on Computer Vision and Pattern Recognition (CVPR), 2020, pp. 4857-4866.
Genova K., et al., "Unsupervised Training for 3D Morphable Model Regression," In Proceedings of the IEEE Conference on Computer Vision and Pattern Recognition (CVPR), 2018, pp. 8377-8386.
Insafutdinov E., et al., "Unsupervised Learning of Shape and Pose with Differentiable Point Clouds," In Advances in Neural Information Processing Systems 31 (NIPS 2018), 2018, 11 pages.
Jiang C., et al., "Local Implicit Grid Representations for 3D Scenes," In Proceedings of the IEEE/CVF Conference on Computer Vision and Pattern Recognition, 2020, pp. 6001-6010.
Kar A., et al., "Learning a Multi-View Stereo Machine," Advances in Neural Information Processing Systems (NeurIPS), 2017, pp. 365-376.
Karras T., et al., "Fast Parallel Construction of High-Quality Bounding Volume Hierarchies," In Proceedings of the 5th High-Performance Graphics Conference, ACM, 2013, 11 pages.
Kato H., et al., "Neural 3D Mesh Renderer," In Proceedings of the IEEE Conference on Computer Vision and Pattern Recognition (CVPR), 2018, pp. 3907-3916.
Kingma D.P., et al., "Auto-Encoding Variational Bayes," arXiv preprint arXiv: 1312.6114, 2013, 14 pages.

Kolos M., et al., "TRANSPR: Transparency Ray-Accumulating Neural 3D Scene Point Renderer," 2020, 11 pages, arXiv:2009.02819 [cs.CV].
Laine S., "Modular Primitives for High-Performance Differentiable Rendering," ACM Transactions on Graphics, 2020, vol. 39, No. 6, Article 194, pp. 1-14.
Lassner C., et al., "Pulsar: Efficient Sphere-Based Neural Rendering," arXiv:2004.07484, 2020, 13 pages.
Li Z., et al., "Neural Scene Flow Fields for Space-Time View Synthesis of Dynamic Scenes," arXiv:2011.13084, 2020, 11 pages.
Lin C-H., et al., "Learning Efficient Point Cloud Generation for Dense 3D Object Reconstruction," In Thirty-Second AAAI Conference on Artificial Intelligence, 2018, pp. 7114-7121.
Liu L., et al., "Neural Sparse Voxel Fields," Neural Information Processing Systems (NeurIPS), 2020, 20 pages.
Liu S., et al., "Soft Rasterizer: A Differentiable Renderer for Image-Based 3D Reasoning," In Proceedings of the IEEE International Conference on Computer Vision, 2019, pp. 7708-7717.
Lombardi S., et al., "Deep Appearance Models for Face Rendering," ACM Transactions on Graphics, Aug. 2018, vol. 37 (4), Article 68, pp. 1-13.
Lombardi S., et al., "Neural Volumes: Learning Dynamic Renderable Volumes from Images," ACM Transactions Graph, Jun. 18, 2019, vol. 38 (4), Article 65, pp. 1-14, XP081383263.
Loper M.M., et al., "OpenDR: An Approximate Differentiable Renderer," In European Conference on Computer Vision, Springer, 2014, pp. 154-169.
Martin-Brualla R., et al., "NeRF in the Wild: Neural Radiance Fields for Unconstrained Photo Collections," Computer Vision and Pattern Recognition (CVPR), 2020, arXiv: 2008.02268v2 [cs.CV], 14 Pages.
Mescheder L., et al., "Occupancy Networks: Learning 3D Reconstruction in Function Space," Computer Vision and Pattern Recognition (CVPR), 2019, pp. 4460-4470.
Meshry M., et al., "Neural Rerendering in the Wild," Proceedings of the IEEE Conference on Computer Vision and Pattern Recognition (CVPR), 2019, pp. 6878-6887.
Mildenhall B., et al., "Local Light Field Fusion: Practical View Synthesis with Prescriptive Sampling Guidelines," ACM Transactions on Graphics (TOG), Jul. 12, 2019, vol. 38 (4), pp. 1-14.
Mildenhall B., et al., "NeRF: Representing Scenes as Neural Radiance Fields for View Synthesis," European Conference on Computer Vision (ECCV), Aug. 3, 2020, 25 pages.
Park J.J., et al., "DeepSDF: Learning Continuous Signed Distance Functions for Shape Representation," Computer Vision and Pattern Recognition (CVPR), 2019, pp. 165-174.
Park K., et al., "Deformable Neural Radiance Fields," arXiv preprint arXiv:2011.12948, 2020, 12 pages.
Peng S., et al., "Convolutional Occupancy Networks," In European Conference on Computer Vision (ECCV), 2020, 17 pages.
Petersen F., et al., "Pix2vex: Image-to-Geometry Reconstruction Using a Smooth Differentiable Renderer," arXiv: 1903.11149, 2019, 13 pages.
Ravi N., et al., "PyTorch3D," 2020, 8 pages, Retrieved from the Internet: URL: https://github.com/facebookresearch/pytorch3d.
Rebain D., et al., "DeRF: Decomposed Radiance Fields," arXiv:2011.12490, 2020, 14 pages.
Ronneberger O., et al., "U-Net: Convolutional Networks for Biomedical Image Segmentation," International Conference on Medical Image Computing and Computer-Assisted Intervention, May 18, 2015, 8 Pages.
Roveri R., et al., "A Network Architecture for Point Cloud Classification via Automatic Depth Images Generation," In Proceedings of the IEEE Conference on Computer Vision and Pattern Recognition, 2018, pp. 4176-4184.
Saito S., et al., "PIFu: Pixel-Aligned Implicit Function for High-Resolution Clothed Human Digitization," International Conference on Computer Vision (ICCV), 2019, pp. 2304-2314.
Saito S, et al., "PIFuHD: Multi-Level Pixel-Aligned Implicit Function for High-Resolution 3D Human Digitization," in Proceedings of the IEEE Conference on Computer Vision and Pattern Recognition (CVPR), Apr. 1, 2020, pp. 84-93.

(56) References Cited

OTHER PUBLICATIONS

Schwarz K., et al., "GRAF: Generative Radiance Fields for 3D-Aware Image Synthesis," Advances in Neural Information Processing Systems (NeurIPS), 2020, vol. 33, 13 pages.

Sitzmann V., et al., "Deepvoxels: Learning Persistent 3d Feature Embeddings," Proceedings of the IEEE!CVF Conference on Computer Vision and Pattern Recognition, 2019, pp. 2437-2446.

Sitzmann V., et al., "Scene Representation Networks: Continuous 3D Structure-Aware Neural Scene Representations," In Advances in Neural Information Processing Systems, 2019, pp. 1121-1132.

Srinivasan P., et al., "NeRV: Neural Reflectance and Visibility Fields forRelighting and View Synthesis." 2020, 12 pages, https://arxiv.org/abs/2012.03927.

Srinivasan P.P., et al., "Pushing the Boundaries of View Extrapolation with Multiplane Images," Computer Vision and Pattern Recognition (CVPR), 2019, pp. 175-184.

Tancik M., et al., "Learned Initializations for Optimizing Coordinate-Based Neural Representations," arXiv:2012.02189, 2020, 13 pages.

Tewari A., et al., "Self-supervised Multi-level Face Model Learning for Monocular Reconstruction at Over 250 Hz," In The IEEE Conference on Computer Vision and Pattern Recognition (CVPR), 2018, pp. 2549-2559.

Tewari A., et al., "State of the Art on Neural Rendering," State of The Art Report (STAR), 2020, vol. 39, No. 2, 27 Pages.

Thies J., et al., "Deferred Neural Rendering: Image Synthesis Using Neural Textures," arXiv: 1904.12356v1 [cs.CV], Apr. 28, 2019, pp. 1-12.

Tran L., et al., "Towards High-Fidelity Nonlinear 3D Face Morphable Model," Computer Vision and Pattern Recognition (CVPR), 2019, pp. 1126-1135.

Tretschk E., et al., "Non-Rigid Neural Radiance Fields: Reconstruction and Novel View Synthesis of a Deforming Scene from Monocular Video," arXiv:2012.12247, 2020, 9 pages.

Trevithick A., et al., "GRF: Learning a General Radiance Field for 3D Scene Representation and Rendering," arXiv:2010.04595, 2020, 28 pages, https://arxiv.org/abs/2010.04595.

Tucker R., et al., "Single-View View Synthesis with Multiplane Images," Computer Vision and Pattern Recognition (CVPR), 2020, pp. 551-560.

\* cited by examiner

MIXTURE OF VOLUMETRIC PRIMITIVES FOR EFFICIENT NEURAL RENDERING

CROSS-REFERENCE TO RELATED APPLICATIONS

The present disclosure is related and claims priority under 35 U.S.C. § 119(e) to U.S. Provisional Application No. 63/141,862, filed on Jan. 26, 2021, to Lombardi, et al., entitled MIXTURE OF VOLUMETRIC PRIMITIVES FOR EFFICIENT NEURAL RENDERING, the contents of which are hereby incorporated by reference, in their entirety, for all purposes.

BACKGROUND

Field

The present disclosure is related generally to the field of generating three-dimensional computer models of subjects in a video capture. More specifically, the present disclosure is related to the accurate and real-time three-dimensional rendering of a person from a video sequence or a two-dimensional image capture using volumetric primitives.

Related Art

Animatable photorealistic digital humans are a key component for enabling social telepresence, with the potential to open up a new way for people to connect while unconstrained to space and time. Typically, three-dimensional (3D) rendering of a subject includes the use of three-dimensional meshes indicative of an object's surface. However, traditional approaches tend to spend too much computation power and time in empty areas of space, and fail to render thin or translucent structures.

Figure 1:
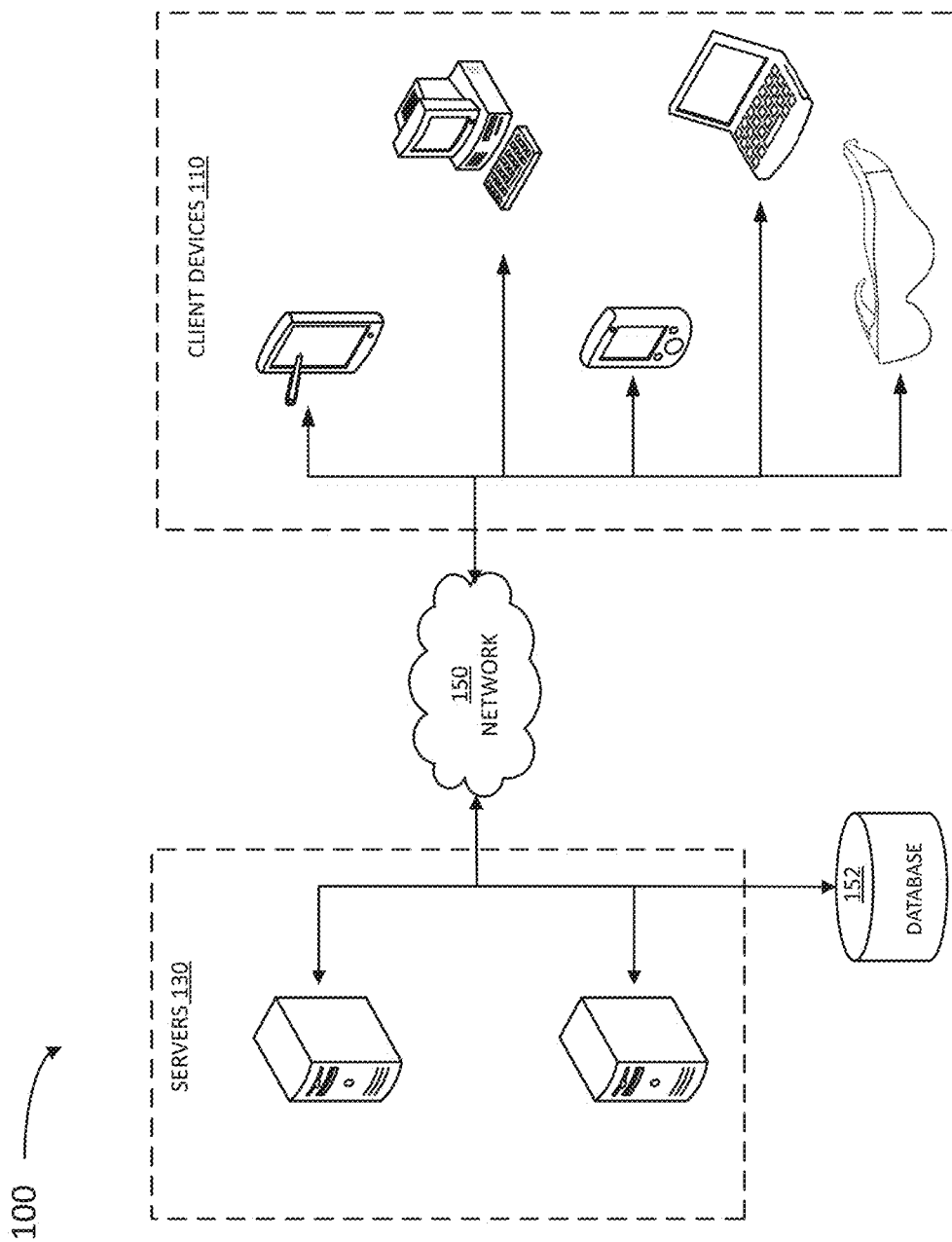
FIG. 1 illustrates an example architecture suitable for providing a real-time, clothed subject animation in a virtual reality environment, according to some embodiments.

In the figures, elements having the same or similar label share the same or similar features, unless expressly stated otherwise.

SUMMARY

In a first embodiment, a computer-implemented method includes collecting multiple images of a subject, the images of the subject including one or more different angles of view of the subject. The computer-implemented method also includes selecting a plurality of vertex positions in a guide mesh, indicative of multiple vertices of a one or more volumetric primitives enveloping the subject, determining a geometric attribute for each of the one or more volumetric primitives, the geometric attribute including a position, a rotation, and a scale factor of the one or more volumetric primitives, and determining a payload attribute for each of the one or more volumetric primitives, the payload attribute including a color value and an opacity value for each voxel in a voxel grid defining the one or more volumetric primitives. The computer-implemented method also includes determining a loss factor for each point in the one or more volumetric primitives based on the geometric attribute, the payload attribute and a ground truth value, and updating a three-dimensional model for the subject according to the loss factor, the three-dimensional model including the one or more volumetric primitives.

In a second embodiment, system includes a memory storing multiple instructions and one or more processors configured to execute the instructions to cause the system to perform operations. The operations include to collect multiple images of a subject, the images of the subject including one or more different angles of view of the subject, to select a plurality of vertex positions in a guide mesh, indicative of multiple vertices of a one or more volumetric primitives enveloping the subject, and to determine a geometric attribute for each of the one or more volumetric primitives, the geometric attribute including a position, a rotation, and a scale factor of the one or more volumetric primitives. The operations also include to determine a payload attribute for each of the one or more volumetric primitives, the payload attribute including a color value and an opacity value for each voxel in a voxel grid defining the one or more volumetric primitives, to determine a loss factor for each point in the one or more volumetric primitives based on the geometric attribute, the payload attribute and a ground truth value, and to update a three-dimensional model for the subject according to the loss factor, the three-dimensional model including the one or more volumetric primitives, wherein to select a plurality of vertex positions in a guide mesh the one or more processors execute instructions to select a constraining factor so that a volume of the one or more volumetric primitives to be greater than a selected threshold.

In a third embodiment, a computer-implemented method includes collecting a binocular image of a subject, generating a three-dimensional model of the subject including a patch of minimally overlapping volumetric primitives based on two or more different views of the subject from the binocular image, and embedding the three-dimensional model of the subject in an immersive reality environment, for a real-time application.

In yet other embodiments, a system includes a first means for storing instructions and a second means for executing the instructions to cause the system to perform a method. The method includes collecting multiple images of a subject, the images of the subject including one or more different angles of view of the subject and selecting a plurality of vertex positions in a guide mesh, indicative of multiple vertices of a one or more volumetric primitives enveloping the subject. The method also includes determining a geometric attribute for each of the one or more volumetric primitives, the geometric attribute including a position, a rotation, and a scale factor of the one or more volumetric primitives, determining a payload attribute for each of the one or more volumetric primitives, the payload attribute including a color value and an opacity value for each voxel in a voxel grid defining the one or more volumetric primitives, and determining a loss factor for each point in the one or more volumetric primitives based on the geometric attribute, the payload attribute and a ground truth value. The method also includes updating a three-dimensional model for the subject according to the loss factor, the three-dimensional model including the one or more volumetric primitives.

In another embodiment, a non-transitory, computer-readable medium stores instructions which, when executed by a computer processor, cause a computer to perform a method. The method includes collecting multiple images of a subject, the images of the subject including one or more different angles of view of the subject and selecting a plurality of vertex positions in a guide mesh, indicative of multiple vertices of a one or more volumetric primitives enveloping the subject. The method also includes determining a geometric attribute for each of the one or more volumetric primitives, the geometric attribute including a position, a rotation, and a scale factor of the one or more volumetric primitives, determining a payload attribute for each of the one or more volumetric primitives, the payload attribute including a color value and an opacity value for each voxel in a voxel grid defining the one or more volumetric primitives, and determining a loss factor for each point in the one or more volumetric primitives based on the geometric attribute, the payload attribute and a ground truth value. The method also includes updating a three-dimensional model for the subject according to the loss factor, the three-dimensional model including the one or more volumetric primitives.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Real-time rendering and animation of dynamic representations of humans is one of the cornerstones for games, movies, and VR telepresence applications. Current methods do not produce high enough fidelity to surpass the uncanny valley or have extremely long render times. We present Mixture of Volumetric Primitives (MVP), a representation for rendering dynamic 3D content that combines the completeness of volumetric representations with the efficiency of primitive-based rendering. Traditional approaches tend to spend too much computation power and time in empty areas of space, and fail to render thin or translucent structures. For example, triangle meshes have difficulty modeling thin structures like hair, and traditional volumetric representations require high-resolution implicit representations that are too slow for use in real-time applications.

To address these technical problems arising in the field of computer networks, computer simulations, and immersive reality applications, embodiments as disclosed herein include a Mixture of Volumetric Primitives (MVP), for rendering dynamic 3D content that combines the completeness of volumetric representations with the efficiency of primitive-based rendering. MVP combines the completeness of volumetric representations with the efficiency of primitive-based rendering, e.g., point-based or mesh-based methods. Some embodiments leverage a convolutional architecture to avoid computation in empty regions of space with volumetric primitives that can move to cover only occupied regions and applying a ray marching technique through occupied parts of space, only. In some embodiments, a volume primitive parameterization supports the integration of correspondence and tracking constraints, while being robust to areas where classical tracking fails, such as around thin or translucent structures and areas with large topological variability.

Some embodiments include a novel motion model for voxel grids that better captures scene motion, minimization of primitive overlap to increase the representational power, and minimization of primitive size to better model and exploit free space. In addition, some embodiments include a highly efficient, data-parallel implementation that enables faster training and real-time rendering of the learned models.

Some embodiments include a volumetric scene representation for dynamic scenes that combines the advantages of volumetric and primitive-based approaches to achieve high performance decoding and efficient rendering. In some embodiments, a dynamic scene representation in an end-to-end manner may be obtained from 2D multi-view image observations of a subject or scene.

Some embodiments can efficiently render high resolution models of 3D space by focusing representation capacity on occupied regions of space and ignoring those that are empty. In some embodiments, a set of minimally overlapping and dynamically moving volumetric primitives together parameterize a color and opacity distribution in space, over time. The primitives are linked to an underlying coarse mesh-based tracking result through soft constraints, but can deviate from the mesh if it leads to improved reconstruction. Both the motion of the primitives as well as the color and opacity distributions are parameterized by a neural network.

Example System Architecture

FIG. 1 illustrates an example architecture 100 suitable for accessing a model training engine, according to some embodiments. Architecture 100 includes servers 130 communicatively coupled with client devices 110 and at least one database 152 over a network 150. One of the many servers 130 is configured to host a memory including instructions which, when executed by a processor, cause the server 130 to perform at least some of the steps in methods as disclosed herein. In some embodiments, the processor is configured to control a graphical user interface (GUI) for the user of one of client devices 110 accessing the model training engine. For purposes of load balancing, multiple servers 130 can host memories including instructions to one or more processors, and multiple servers 130 can host a history log and a database 152 including multiple training archives used for the model training engine. Moreover, in some embodiments, multiple users of client devices 110 may access the same model training engine to run one or more machine learning models. In some embodiments, a single user with a single client device 110 may train multiple machine learning models running in parallel in one or more servers 130. Accordingly, client devices 110 may communicate with each other via network 150 and through access to one or more servers 130 and resources located therein.

Servers 130 may include any device having an appropriate processor, memory, and communications capability for hosting the model training engine including multiple tools associated with it. The model training engine may be accessible by various clients 110 over network 150. Client devices 110 can be, for example, desktop computers, mobile computers, tablet computers (e.g., including e-book readers), mobile devices (e.g., a smartphone or PDA), or any other device having appropriate processor, memory, and communications capabilities for accessing the model training engine on one or more of servers 130. In some embodiments, a client device 110 may include a virtual reality (VR), or augmented reality (AR) headset. Accordingly, an application installed in the headset may use a 3D rendering model to create an immersive reality environment. Network 150 can include, for example, any one or more of a local area tool (LAN), a wide area tool (WAN), the Internet, and the like. Further, network 150 can include, but is not limited to, any one or more of the following tool topologies, including a bus network, a star network, a ring network, a mesh network, a star-bus network, tree or hierarchical network, and the like.

Figure 2:
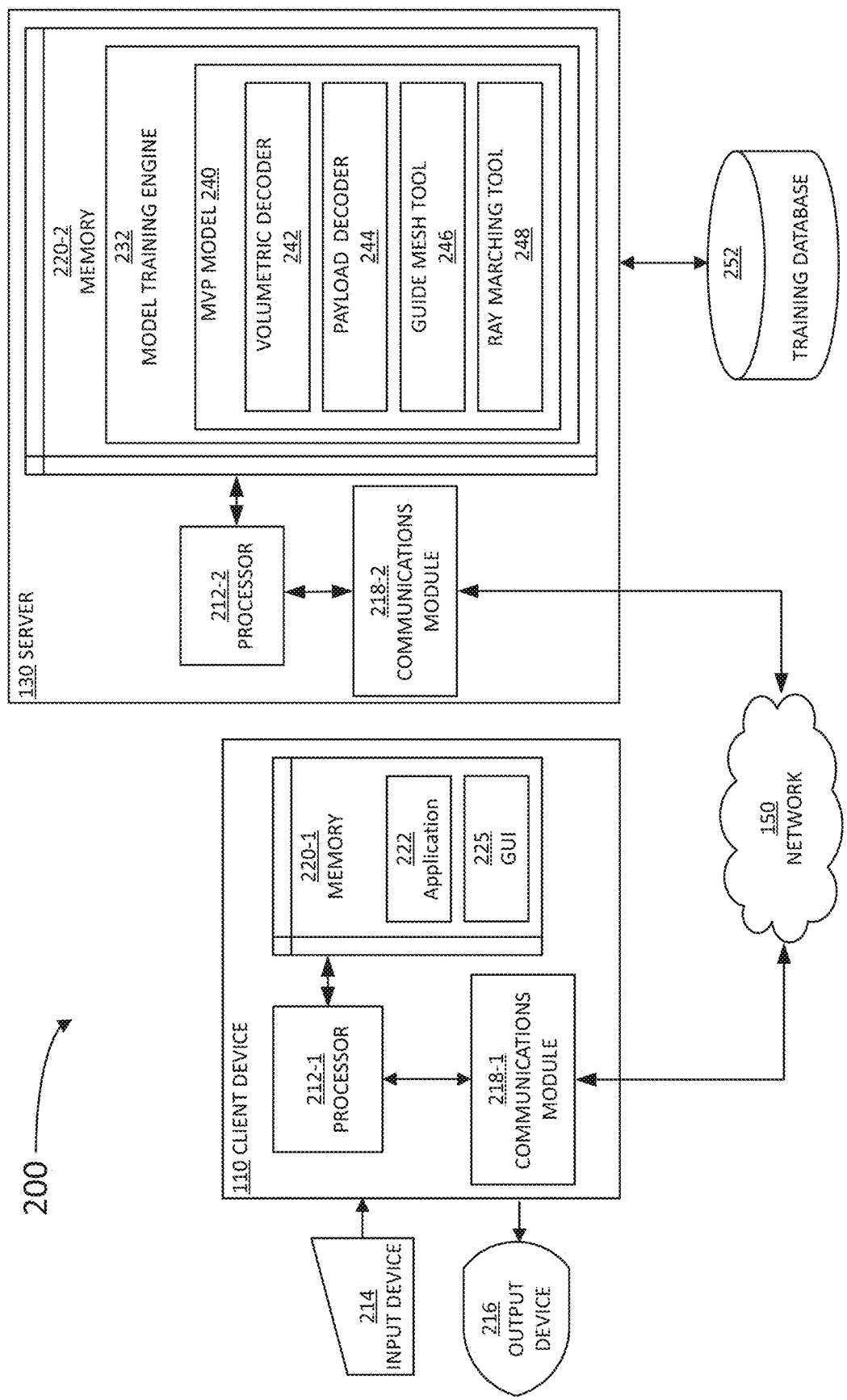
FIG. 2 is a block diagram illustrating an example server and client from the architecture of FIG. 1, according to certain aspects of the disclosure.

FIG. 2 is a block diagram 200 illustrating an example server 130 and client device 110 from architecture 100, according to certain aspects of the disclosure. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices via network 150. Communications modules 218 can be, for example, modems or Ethernet cards. Client device 110 may be a desktop computer, a mobile computer (e.g., a laptop, a palm device, a tablet, or a smart phone), or an AR/VR headset configured to provide an immersive reality experience to a user.

A user may interact with client device 110 via an input device 214 and an output device 216. Input device 214 may include a mouse, a keyboard, a pointer, a joystick, a touchscreen, a microphone, a video camera, and the like. In some embodiments, input device 214 may include a back-facing camera to capture the face of a user of a VR/AR headset, or a portion thereof, including an eye. Accordingly, in some embodiments, input device 214 may include an eye tracking device to capture the movement of a user's pupil in an AR/VR headset. Output device 216 may be a screen display (e.g., a VR/AR display), a touchscreen, a speaker, and the like. Client device 110 may include a memory 220-1 and a processor 212-1. Memory 220-1 may include an application 222 and a GUI 225, configured to run in client device 110 and couple with input device 214 and output device 216. Application 222 may be downloaded by the user from server 130, and may be hosted by server 130.

Server 130 includes a memory 220-2, a processor 212-2, and communications module 218-2. Hereinafter, processors 212-1 and 212-2, and memories 220-1 and 220-2, will be collectively referred to, respectively, as "processors 212" and "memories 220." Processors 212 are configured to execute instructions stored in memories 220. In some embodiments, memory 220-2 includes a model training engine 232. Model training engine 232 may share or provide features and resources to GUI 225, including multiple tools associated with training and using a three-dimensional avatar rendering model for immersive reality applications. The user may access model training engine 232 through GUI 225 installed in a memory 220-1 of client device 110. Accordingly, GUI 225 may be installed by server 130 and perform scripts and other routines provided by server 130 through any one of multiple tools. Execution of GUI 225 may be controlled by processor 212-1. In some embodiments, GUI 225 includes an interactive display that reads inputs and outputs from a virtual joystick representing a real joystick handled by the user (input device 214).

Model training engine 232 may be configured to create, store, update, and maintain a real-time MVP model 240, as disclosed herein. MVP model 240 may include encoders, decoders, and tools such as a volumetric decoder 242, a payload decoder 244, a guide mesh tool 246, and a ray marching tool 248. In some embodiments, model training engine 232 may access one or more machine learning models stored in a training database 252. Training database 252 includes training archives and other data files that may be used by model training engine 232 in the training of a machine learning model, according to the input of the user through GUI 225. Moreover, in some embodiments, at least one or more training archives or machine learning models may be stored in either one of memories 220, and the user may have access to them through GUI 225.

Volumetric decoder 242 determines a primitives' model-to-world transformations according to a classification scheme that is learned by training, and predicts, using guide mesh tool 246, a guide mesh that will be the anchor for the volumetric primitives. Payload decoder 244 determines the color and opacity stored in the voxels within each volumetric primitive. Ray marching tool 248 performs a ray accumulation of color and opacity according to selected mathematical rules along a view vector to model view-dependent phenomena.

Model training engine 232 may include algorithms trained for the specific purposes of the engines and tools included therein. The algorithms may include machine learning or artificial intelligence algorithms making use of any linear or non-linear algorithm, such as a neural network algorithm, or multivariate regression algorithm. In some embodiments, the machine learning model may include a neural network (NN), a convolutional neural network (CNN), a generative adversarial neural network (GAN), a deep reinforcement learning (DRL) algorithm, a deep recurrent neural network (DRNN), a classic machine learning algorithm such as random forest, k-nearest neighbor (KNN) algorithm, k-means clustering algorithms, or any combination thereof. More generally, the machine learning model may include any machine learning model involving a training step and an optimization step. In some embodiments, training database 252 may include a training archive to modify coefficients according to a desired outcome of the machine learning model. Accordingly, in some embodiments, model training engine 232 is configured to access training database 252 to retrieve documents and archives as inputs for the machine learning model. In some embodiments, model training engine 232, the tools contained therein, and at least part of training database 252 may be hosted in a different server that is accessible by server 130.

Figure 3:
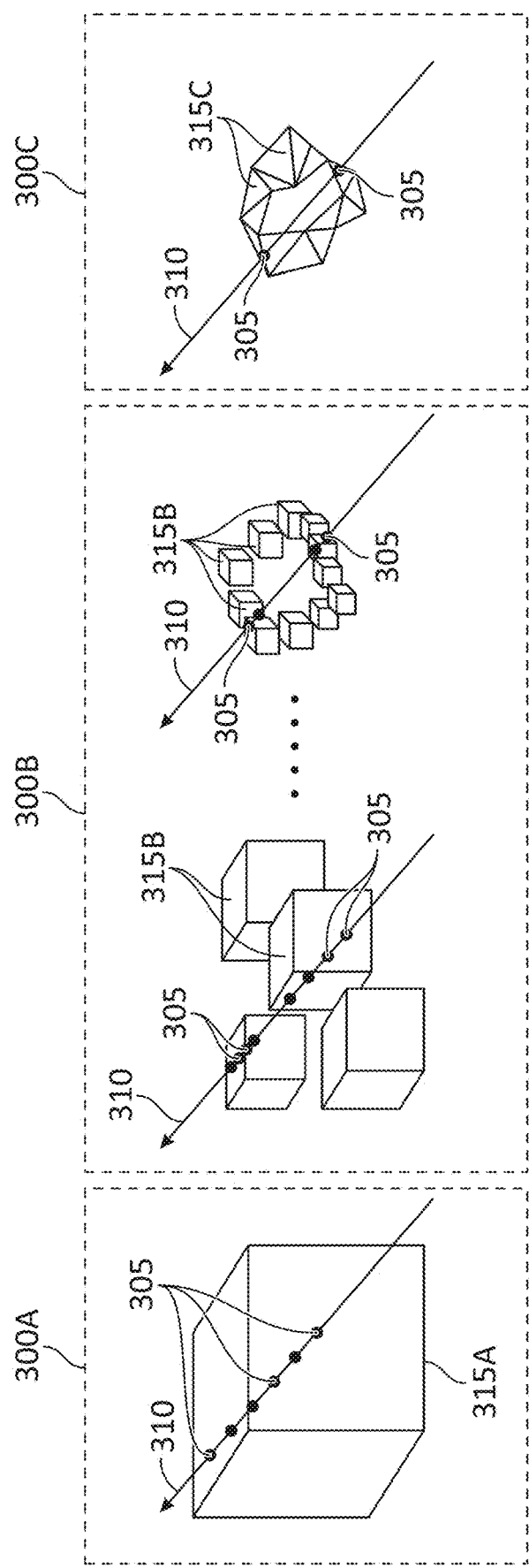
FIG. 3 illustrates a comparison of different three-dimensional (3D) rendering approaches including a volumetric primitive technique with ray marching, according to some embodiments.

FIG. 3 illustrates a comparison of different 3D rendering approaches 300A, 300B, and 300C (hereinafter, collectively referred to as "3D renderings 300") including a volumetric primitive technique with ray marching 300B, according to some embodiments.

The difference of approach between 3D renderings 300 is appreciated by the rendition along a line of sight 310. Within a selected volumetric component 315A or 315B (hereinafter, collectively referred to as "volumetric components 315"), multiple points 305 are selected to project color and opacity values along line of sight 310. It is desirable then that points 305 be located within a solid body and not empty space, to avoid unnecessary computation and artifacts. As can be seen, while volumetric components 315 increase in number, the number of points 305 is reduced, together with the number of primitives that lie within empty space. This reduces the computation cost of 3D rendering 300B and artifact effects. A surface mesh approach 300C is convenient in many instances, but has the drawback of missing transparent or semi-opaque portions of a solid body, and has difficulty in dealing with objects having special (rich or granular) textures, such as hair, and the like. Volumetric rendering 300C is a 2D mesh surface in three dimensions, composed of triangles 315C as area elements.

Figure 4:
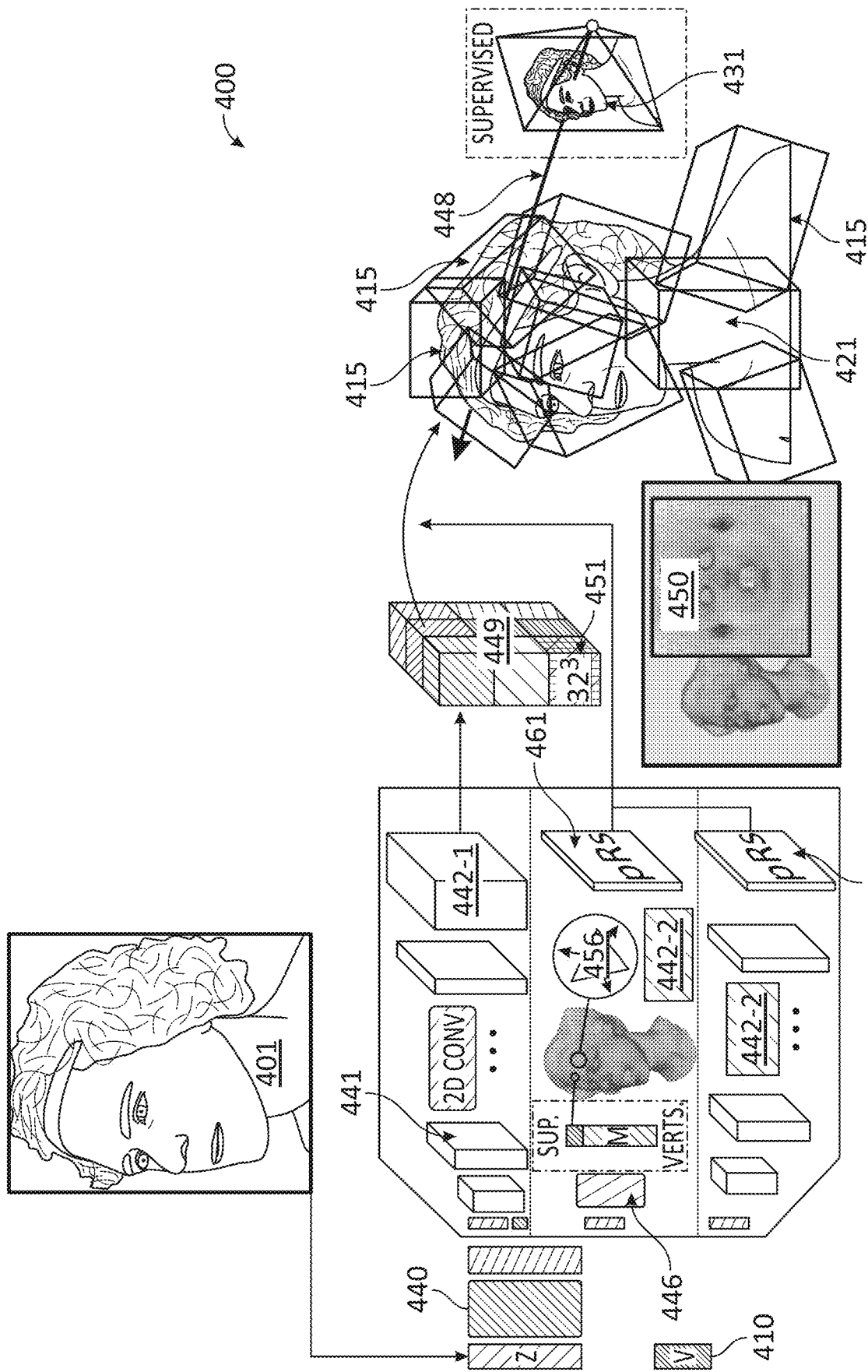
FIG. 4 illustrates a schematic of an MVP model, according to some embodiments.

FIG. 4 illustrates a schematic of an MVP model 400 of a subject 401, according to some embodiments. A latent code Z 440 is encoded and decoded into a slab 441 of volumetric primitives 415 that envelope subject 401. A multilayer perceptron (MLP) routine 446 identifies vertex positions of a guide mesh 456, which is used to compute a base transformation 461 for each primitive ($t_k$, $R_k$, $s_k$). Transformation 461 may include a rotation matrix from the tangent, bitangent, normal vectors at points evenly distributed in the 2D space of mesh 456. A residual transformation 462 ($\delta t_k$, $\delta R_k$, $\delta s_k$) takes into account shifts and changes in a selected time interval increment (to account for real-time modeling). A 3D slab 449 is divided into volumetric primitives 415, and transformed into world space by composing transformations 461 and 462. A ray march tool 448 scans through volumetric primitives 415, accumulating color and opacity along a line of sight 410, to form the reconstructed image 431 of a solid, 3D model 421 of subject 401. Reconstructed image 431 and the vertex positions of mesh 456 are supervised during training from ground truth data.

MVP model 400 includes a number, $N_{prim}$, of volumetric primitives 415 to model subject 401. Each volumetric primitive 415, $V_k = \{t_k, R_k, s_k, V_k\}$, is defined by a position $t_k \in R^3$ in 3D space, an orientation given by a rotation matrix $R_k \in SO(3)$ (computed from an axis-angle parameterization), and per-axis scale factors $s_k \in R_3$. Together, these parameters uniquely describe the model-to-world transformation 461 of each volumetric primitive 415, in 3D slab 449. Each volumetric primitive 415 contains a payload 451 that describes the appearance and geometry of the associated region in space. Payload 451 is defined by a dense voxel grid $V_k \in R^{4 \times M_x \times M_y \times M_z}$ that stores the color (3 channels) and opacity (1 channel) for the $M_x \times M_y \times M_z$ voxels, with M* being the number of voxels along each spatial dimension. For simplicity of illustration, the volumes may be cubes with M*=M unless stated otherwise. Volumetric primitives 415 are weakly constrained to the surface of guide mesh 456 and are allowed to deviate from it (e.g., by transformation 462) if that improves reconstruction quality. Specifically, their position $t_k = \hat{t}_k + \delta_{t^k}$, rotation $R_k = \delta_{R^k} \cdot \hat{R}_k$, and scale $s_k = \hat{s}_k + \delta_{s^k}$ are modeled relative to the guide mesh base transformations 461 and 462. To compute a mesh based initialization, MVP model 400 generates a 2D grid in the mesh's texture space and generates the primitives at the 3D locations on the mesh that correspond to the uv-coordinates of the grid points (e.g., a 2D surface projected on the solid model). The orientation of volumetric primitives 415 is initialized based on the local tangent frame of the 3D surface point they are attached to. The scale of the boxes is initialized based on the local gradient of the uv-coordinates at the corresponding grid point position. Thus, volumetric primitives 415 are initialized with a scale in proportion to distances to their neighbors.

MVP model 400 allows volumetric primitives 415 to deviate from the guide mesh and is important to account for deficiencies in the initialization strategy, low guide mesh quality, and insufficient coverage of objects in the scene. Additionally, it is desirable to consider that during training MVP model 400 receives gradients from regions of space that the primitives cover, resulting in a limited ability to self-assemble and to expand to attain more coverage of the scene's content. In some embodiments, rather than reducing opacity in empty regions, it is desirable to move empty volumetric primitives 415 to focus on regions with higher occupancy. To achieve this, some embodiments include a windowing function $W \in R^{M^3}$ to the opacity of the payload that takes the form:

$$W(x,y,z) = \exp\{-\alpha(x^\beta + y^\beta + z^\beta)\} \quad (1)$$

where $(x, y, z) \in [-1, 1]^3$ are normalized coordinates within the primitive's payload volume 451. Here, $\alpha$ and $\beta$ are hyperparameters that control the rate of opacity decay towards the edges of volume 451. Windowing function in Eq. (1) adds an inductive bias to explain the scene's contents via motion instead of payload volume 451 since the magnitude of gradients that are propagated through opacity values at the edges of payload volume 451 are downscaled. Note that this does not prevent the edges of the opacity payload from being able to take on large values; rather, the construction induces payload volumes 451 to learn more slowly, thus favoring motion of volume primitives 415 whose gradients are not similarly impeded. In some embodiments, $\alpha = 8$ and $\beta = 8$ is a good balance between scene coverage and reconstruction accuracy and keeps them fixed for all experiments (cf. Eq.(1)).

Some embodiments include an encoder-decoder network to parameterize the coarse tracked proxy mesh 456 as well as a weakly linked mixture of volumetric primitives 415. In some embodiments, encoder 440 implements a Variational Autoencoders (VAEs) to encode the dynamics of a scene using a low-dimensional latent code $Z \in R^{256}$. Encoder 440 encourages a well-structured latent space Z, during training. In some embodiments, encoder 440 can be discarded upon training completion and replaced with an application specific encoder or simply with latent space traversal.

When coarse mesh tracking is available, encoder 440 takes as input the tracked geometry and view-averaged un-warped texture 450 for each frame (in 2D space). Geometry is passed through a fully connected layer, and texture 450 through a convolutional branch, before being fused and further processed to predict the parameters of transformations 461 and 462 with a normal distribution N(μ, σ), where $\mu \in R^{256}$ is the mean and $\sigma \in R^{256}$ is the standard deviation. When tracking is not available, encoder 440 takes images from K=1 fixed view as input. To learn a smooth latent space with good interpolation properties, encoder 440 may include a KL-divergence loss to induce a predicted distribution to stay close to a standard normal distribution. Latent vector $z \in R^{256}$ is obtained by sampling from the predicted distribution using reparameterization.

In some embodiments, MVP model 400 may include a payload decoder 442-1 and geometry decoders 442-2. Geometry decoders 442-2 determine the primitives' model-to-world transformations 461 and 462. For example, geometry decoders 442-2 may include a network $D_{mesh}: R^{256} \rightarrow R^{3 \times N_{mesh}}$ to predict the guide mesh M 456 used to initialize transformations 461 and 462. In some embodiments, network $D_{mesh}$ may include a sequence of fully connected layers. A network $D_{pRs}: R^{256} \rightarrow R^{9 \times N_{prim}}$ is responsible for predicting the deviations in position, rotation (as a Rodrigues vector), and scale $(\delta t_k, \delta R_k, \delta s_k)$ from the guide mesh initialization. Network $D_{pRs}$ may use a 2D convolutional architecture to produce the motion parameters as channels of a 2D grid following the primitive's ordering in the texture's 2D space.

Payload decoder 442-1 determines the color and opacity stored in the primitives' voxel grid $V_k$. In some embodiments, decoder 442-1 includes a network $D_\alpha: R^{256} \rightarrow R^{1 \times M^3 \times N_{prim}}$ to compute opacity based on a 2D convolutional architecture. Also, decoder 442-1 may include a network $D_{rgb}: R^{256+3} \rightarrow R^{3 \times M^3 \times N_{prim}}$ to compute view-dependent RGB color. In some embodiments, network $D_{rgb}$ is based on 2D transposed convolutions and uses an object-centric view-vector 410, $D_{view} \in R^3$. In some embodiments, vector 410 is a vector pointing to the center of the object/scene, from a selected point of view. View vector 410 allows payload decoder 442-1 to model view-dependent phenomena, like specularities, and provide a true 3D immersive feeling to the user of a VR/AR application, as disclosed herein. Unlike geometry decoders 442-2, which employ small networks and are efficient to compute, payload decoder 442-1 may incur in significant computational cost due to the total number of elements they have to generate. To address this challenge, some embodiments avoid redundant computation through the use of a convolutional architecture, and a ray marching strategy that avoids empty spaces. Nearby locations in 3D slab 449 leverage shared features from earlier layers of the network. Since the texture space is the result of a mesh-atlasing algorithm that tends to preserve the locality structure of 3D mesh 456, the regular grid ordering of payload 451 well leverages the spatially coherent structures afforded by deconvolution.

In some embodiments, MVP model 400 includes a background model to render objects in a scene from an outside-in camera configuration, when the extent of object coverage is not known a-priori. The background model includes a mechanism for separating objects from the background in the scene. In some embodiments, a segmentation algorithm may be implemented. However, to capture fine details around object borders in a consistent 3D environment, a background model may include the objects of interest in addition to a scene background. Whereas objects of interest may be rendered using MVP model 400, the background model includes a separate neural network to model the background as a modulation of images captured of the empty scene with the objects absent. Specifically, our background model for the $i^{th}$-camera takes the form $$B_i(x) = \text{softplus}\{\bar{B}_i + F_g(c_i, d_i(x))\} \qquad (2)$$

where $\bar{B}_i$ is the image of the empty capture space, $c_i$ is the center of the camera used to collect the training image, and $d_i$ is the ray direction for pixel x. The function $F_g$ is an MLP with weights θ that takes position-encoded camera coordinates and ray directions and produces an RGB-color using an architecture similar to neural radiance fields (NeRF). In some embodiments, background images of the empty scene are not sufficient by themselves since objects in the scene can have effects on the background, which, if not accounted for, may result in hazy reconstructions, shadowing, and content outside of the modeling volume, like supporting stands and chairs. In some embodiments, MVP model 400 produces an image with color, I (e.g., RGB), and opacity (A), channels. These are combined with the background image to produce the final output that is compared to the captured images during training through alpha-compositing, as follows:

$$\tilde{I}_i = A_i I_i + (1 - A_i) B_i.$$

To efficiently render images, MVP model 400 combines an efficient ray marching tool 448 with a differentiable volumetric aggregation scheme. Accordingly, a scene representation is able to focus the representational power of the encoder-decoder network on the occupied regions of 3D space, thus leading to a high-resolution model and efficient decoding.

To achieve efficient ray marching, in some embodiments MVP model 400 may skip samples in empty space, and employ efficient payload sampling. A regular grid structure of payload 451 enables efficient sampling via trilinear interpolation. Ray marching tool 448 finds within which volume primitives 415 a current evaluation point lies. Volume primitives 415 tend to be highly irregular with positions, rotations, and scales that vary on a per frame basis. For this, a highly optimized data-parallel a bounding volume hierarchy (BVH) that takes less than 0.1 ms for 4096 primitives at construction time. This enables MVP model 400 to rebuild the BVH on a per-frame basis, thus handling dynamic scenes, and provides efficient intersection tests. Ray marching tool 448 computes and stores volume primitives 415 that each ray intersects, wherein the ray may be defined by vector 410. The intersection of volume primitive 415 with a ray defined by vector 410 determines a domain of integration $(t_{min}, t_{max})$. While marching along a ray between $t_{min}$ and $t_{max}$, ray marching tool 448 checks each sample against the ray-specific list of intersected primitives. This approach exhibits very fast sampling. If the number of overlapping primitives is kept low, the total sampling cost is much smaller than a deep MLP evaluation at each step, and close to real time even with a good importance sampling strategy.

In some embodiments, a differentiable image formation model enables end-to-end training based on multi-view imagery. Given the sample points in occupied space extracted by ray marching tool 448, MVP model 400 includes a cumulative volume rendering scheme by front-to-back additive alpha blending. During this process, a ray defined by vector 410 accumulates color as well as opacity. Given a ray $r_p(t)=o_p+t_{dp}$ with starting position op and ray direction dp, MVP model 400 solves the following integral using numerical quadrature:

$$I_p = \int_{t_{min}}^{t_{max}} V_{col}(r_p(t)) \cdot \frac{dT(t)}{dt} dt$$

$$T(t) = \min\left(\int_{t_{min}}^{t} V_\alpha(r_p(t))dt, 1\right)$$

Here, Vcol and Vα are the global color and opacity field computed based on the current instantiation of the volumetric primitives. The alpha value associated with the pixel is set as Ap=T ($t_{max}$). For high performance rendering, an early stopping strategy based on the accumulated opacity, i.e., if the accumulated opacity is larger than 1.0−∈, ray marching tool 448 terminates early, since the rest of the sample points do not have a significant impact on the final pixel color. When a sample point is contained within multiple volumetric primitives, ray marching tool 448 combines their values in their BVH order based on the accumulation scheme. Use of the additive formulation for integration, as opposed to the multiplicative form, is motivated by its independence to ordering up to the saturation point. This allows for a backward pass implementation that is more memory efficient, since there is no need to keep the full O(n2) graph of operations. Thus, the implementation requires less memory and allows for larger batch sizes during training.

Some embodiments include an end-to-end training procedure using many 2D multi-view images from subject 401. The trainable parameters of the model are labeled Θ. Given a multi-view video sequence $\{I(i)\}^{Nimg}_{i=1}$, with: $N_{img}=N_{frames}\cdot N_{cams}$, training images, MVP model 400 finds the optimal parameters Θ* that best fit the training data. To this end, MVP model 400 solves the following optimization problem:

$$\Theta^* = \underset{\Theta}{\mathrm{argmin}} \sum_{i=0}^{N_{img}-1} \sum_{p=0}^{N_{pixels}-1} \mathcal{L}(\Theta; I_p^{(i)})$$

In some embodiments, MVP model 400 solves this optimization problem using stochastic mini-batch optimization. In each iteration, a training strategy uniformly samples rays from each image in the current batch, to define the loss function, L. In some embodiments, a learning rate lr=0.0001 may be used, with other parameters set to their default values. A comprehensive loss function, L, may be defined as:

$$\mathcal{L}(\Theta;I_p) = \mathcal{L}_{pho}(\Theta;I_p) + \mathcal{L}_{geo}(\Theta) + \mathcal{L}_{vol}(\Theta) + \mathcal{L}_{del}(\mathcal{L}) + \mathcal{L}_{kld}(\Theta)$$

The loss function, L, may include a photometric reconstruction loss $L_{pho}$, a coarse geometry reconstruction loss $L_{geo}$, a volume minimization prior $L_{vol}$, a delta magnitude prior $L_{del}$, and a Kullback-Leibler (KL) divergence prior $L_{kld}$ to regularize the latent space of our Variational Autoencoder (VAE).

The photometric reconstruction loss $L_{pho}$ ensures that the synthesized images look photorealistic and match the ground truth. To this end, MVP model 400 compares the synthesized pixels $\bar{I}_p(\Theta)$ to the ground truth $I_p$ using the following loss function:

$$\mathcal{L}_{pho} = \lambda_{pho} \frac{1}{N_p} \sum_{p \in P} \|I_p - \bar{I}_p(\Theta)\|_2^2$$

P is the set of sampled pixels. Some embodiments may include a relative weight of $\lambda_{photo}=1.0$.

The mesh reconstruction loss $L_{geo}$ ensures that the coarse mesh proxy follows the motion in the scene. Accordingly, $L_{geo}$ compares the regressed vertex positions to the available ground truth traced mesh, as follows:

$$\mathcal{L}_{geo} = \lambda_{geo} \frac{1}{N_{mesh}} \sum_{i=0}^{N_{mesh}} \|v_i - \bar{v}_i(\Theta)\|_2^2$$

where $\bar{v}_i(\Theta)$ is the corresponding regressed vertex position. In some embodiments, $L_{geo}$ pulls volumetric primitives 415, which are weakly linked to mesh 456, to an approximately correct position. Note that volumetric primitives 415 are only weakly linked to mesh 456 and can deviate from their initial positions if that improves the photometric reconstruction loss. MVP model 400 sets a relative weight of $\lambda_{geo}=0.1$.

A volume minimization prior Lol constrains volumetric primitives 415 to be as small as possible. The reasons for this are twofold: to prevent volumetric primitives 415 from overlapping too much, since this wastes model capacity in already well explained regions, and to prevent loss of resolution by large volumetric primitives 415 overlapping empty space. Accordingly, volume minimization prior $L_{vol}$ may be as:

$$\mathcal{L}_{vol} = \lambda_{vol} \sum_{i=1}^{N_{prim}} Prod(s_i)$$

Here, $s_i=\hat{s}_i+\delta s_i$ is the vector of side lengths of the primitive and Prod(•) is the product of the values of a vector, e.g., in our case the volume of a primitive. We minimize the total volume with a relative weight of $\lambda_{vol}=0.01$.

Figure 5:
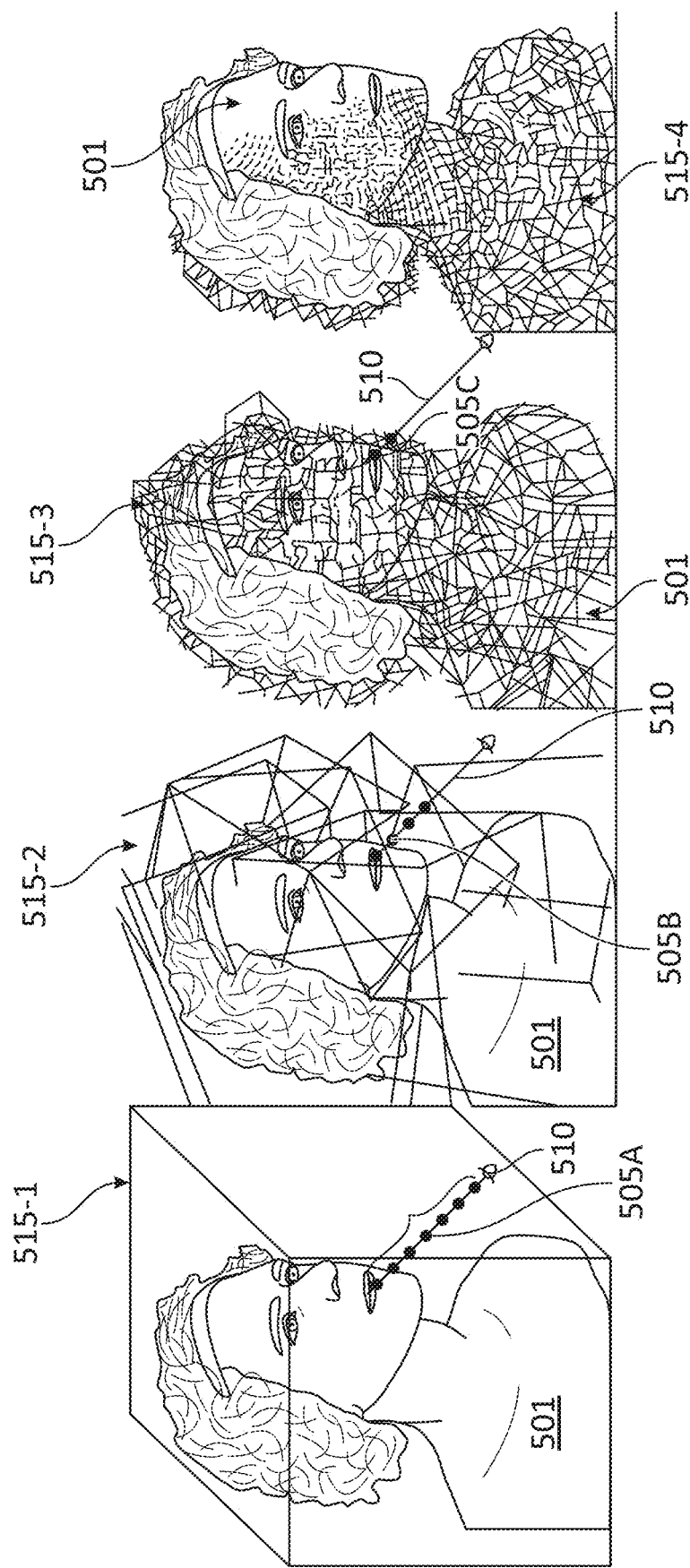
FIG. 5 illustrates an example of a three-dimensional model rendition with an MVP model, according to some embodiments.

FIG. 5 illustrates an example of a three-dimensional model rendition of a subject 501 with an MVP model (e.g., MVP model 400), according to some embodiments. The MVP model inherits the strengths of both volumetric as well as primitive-based approaches, while avoiding many of their pitfalls. Different quality renditions are illustrated by selecting the number of volumetric primitives 515-1 (one), 515-2 (eight), and 515-3 (five hundred twelve) and 515-4 (four thousand), hereinafter, collectively referred to as "volumetric primitives 515," used by the model. All the examples have the same number of voxels (distributed along different number of volumetric primitives 515). A view direction 510 intersects volumetric primitives and sampling points 505A, 505B, and 505C (hereinafter, collectively referred to as "sampling points 505") and are used by a ray tracing tool (e.g., ray tracing tools 248 and 448).

Figure 6A:
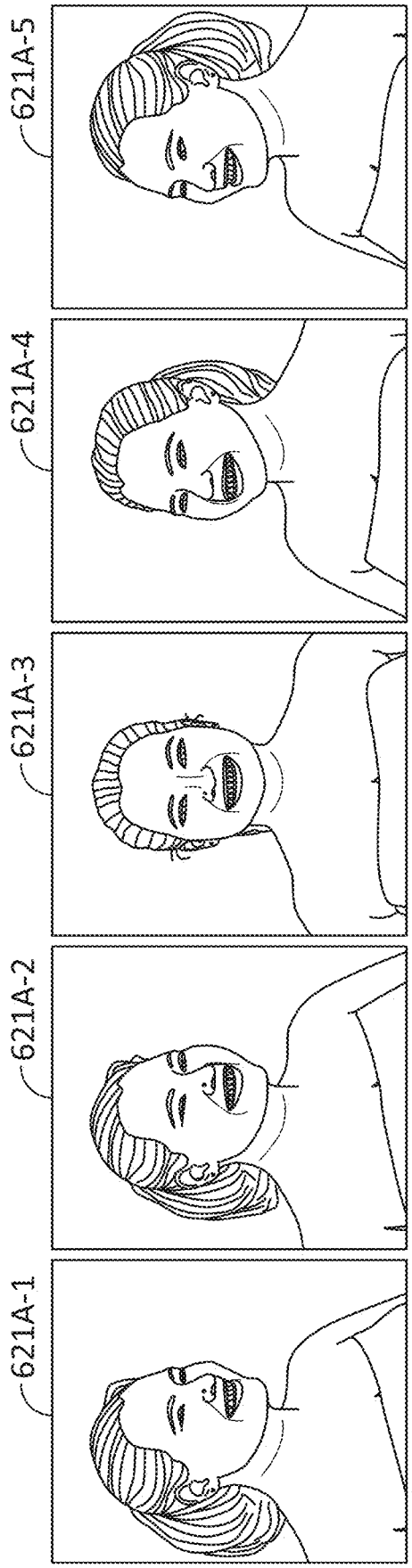
FIGS. 6A-6B illustrate examples of 3D rendition of subjects A and B, using MVP models, according to some embodiments.
Figure 6B:
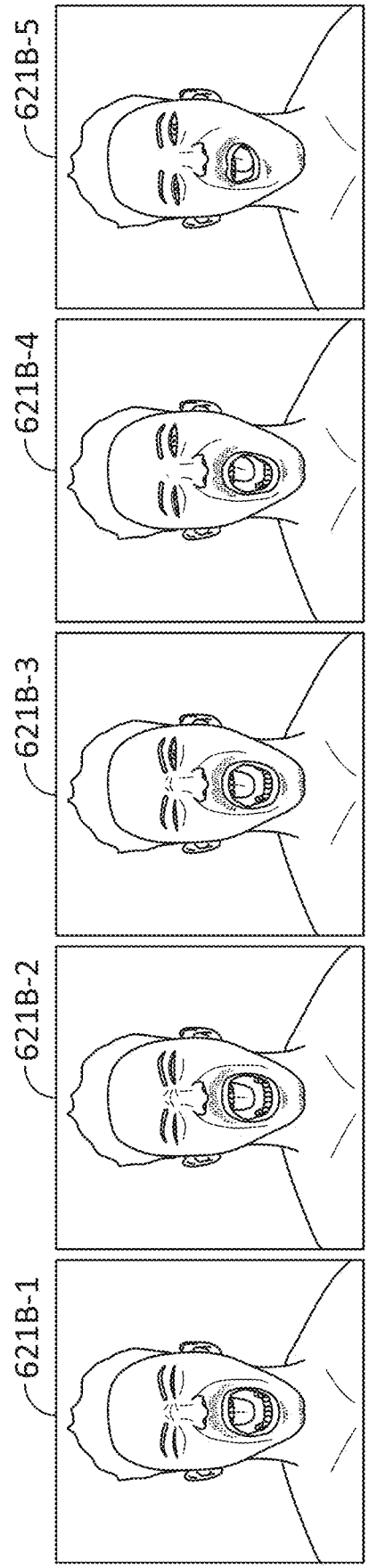

FIGS. 6A-6B illustrate examples of 3D models 621A-1, 621A-2, 621A-3, 621A-4, and 621A-5 (collectively referred to, hereinafter, as "3D models 621A"), and 3D models 621B-1, 621B-2, 621B-3, 621B-4, and 621B-5 (collectively referred to, hereinafter, as "3D models 621B") of subjects A and B (collectively referred to, hereinafter, as "3D models 621"), using MVP models consistent with the present disclosure.

Models 621A are the result of a synthesis of a complete, dynamic, upper body at real-time rates. Models 621B are the result of an MVP model for animating 3D reconstructions via latent-space interpolation between two keyframes. Even for extremely challenging facial expressions, the interpolated results are highly realistic. The output of the MVP motion model, which produces rotations, translations, and scales, is effectively a forward warp. Such a warp can be sensibly-interpolated.

Figure 7:
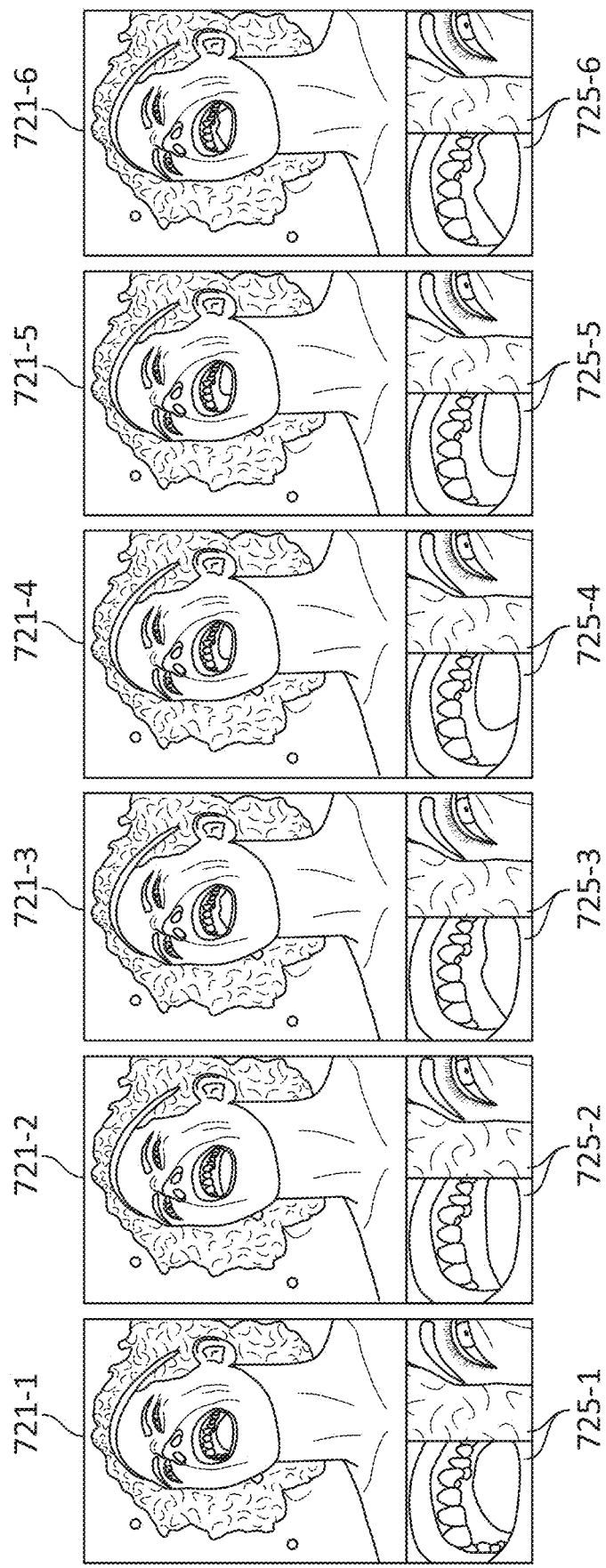
FIG. 7 illustrates examples of MVP models using different numbers of volumetric primitives, according to some embodiments.

FIG. 7 illustrates examples of MVP models using different numbers of volumetric primitives to obtain 3D models 721-1 (ground truth), 721-2 (neural volume), 721-3 (8 volumetric primitives), 721-4 (512 volumetric primitives), 721-5 (32$k$ volumetric primitives) with a constant number of voxels (2 million), and 721-6 (256 volumetric primitives with 8 million voxels), hereinafter, collectively referred to as "3D models 721," according to some embodiments. To illustrate the detailed achieved, close captioning 725-1, 725-2, 725-3, 725-4, 725-5, and 725-6 illustrate the mouth interior of 3D models 721 (hereinafter, collectively referred to as "mouth interiors 725").

Accordingly, hundreds of volumetric primitives give the best balance of quality and performance, with higher numbers of primitives exhibiting fine detail, but struggling with elaborate motion, c.f., mouth interiors 725.

Figure 8:
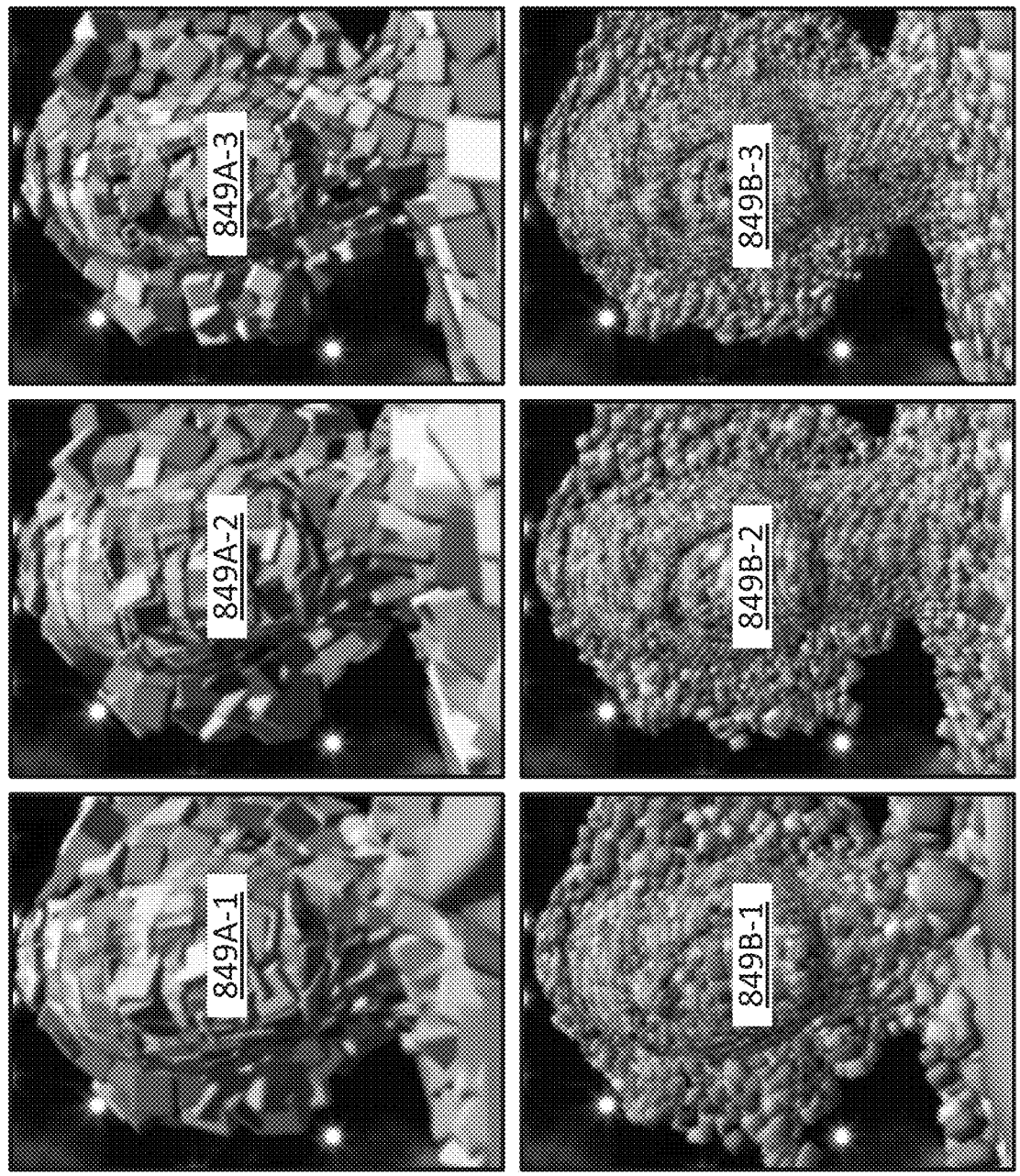
FIG. 8 illustrates different strengths of the volumetric constraint for the MVP model for different numbers of volumetric primitives used, according to some embodiments.

FIG. 8 illustrates different strengths of the volumetric constraint for the superposition of volumetric primitives 849A-1, 849A-2, and 849A-3 (λ=0.001, 0.01, and 0.1, respectively, hereinafter, collectively referred to as "volumetric strengths 849A") for an MVP model with 512 volumetric primitives (A), and the superposition of volumetric primitives 849B-1, 849B-2, and 849B-3 (hereinafter, collectively referred to as "volumetric strengths 849B") in an MVP model with 32 k volumetric primitives with similar volumetric constraints. A stronger volume constraint leads to less overlap and thus speeds up a ray marching tool as disclosed herein (cf. ray marching tool 248 and 448). When the volume constraint is too strong, however, holes may appear and the reconstruction error may increase.

Figure 9:
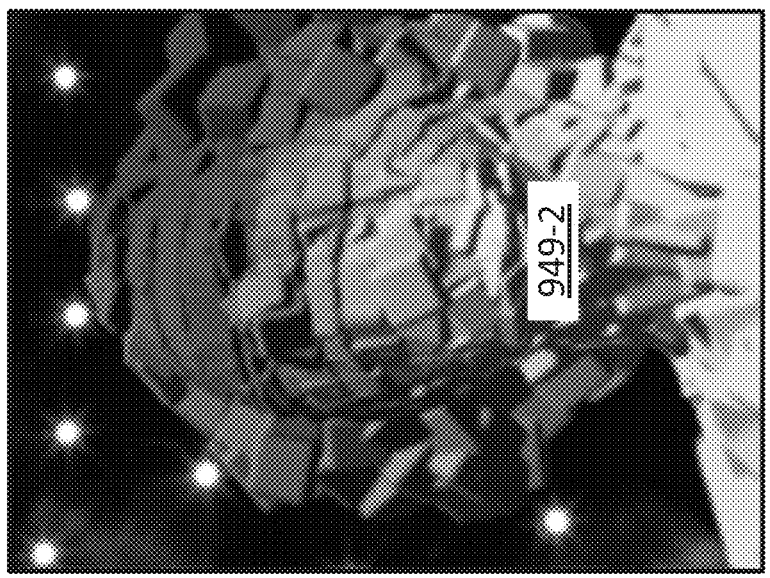
FIG. 9 illustrates the use of an opacity fade factor in an MVP model, according to some embodiments.
Figure 9:
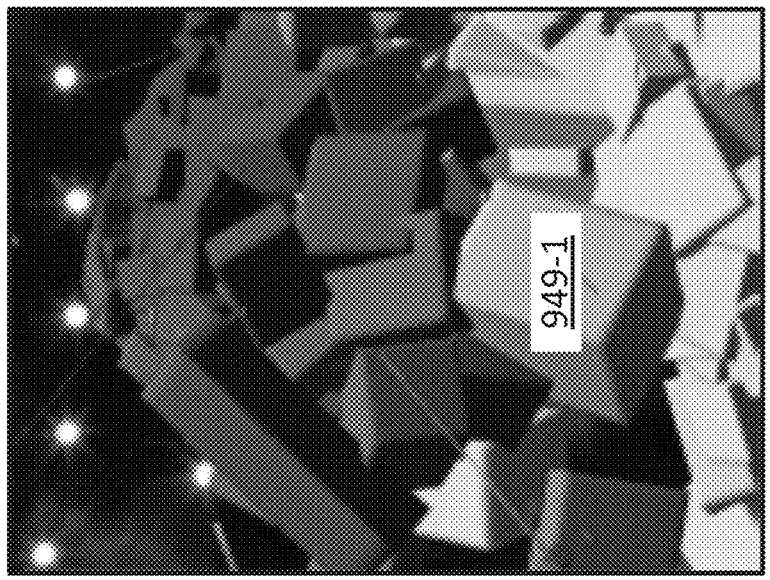
Figure 9:
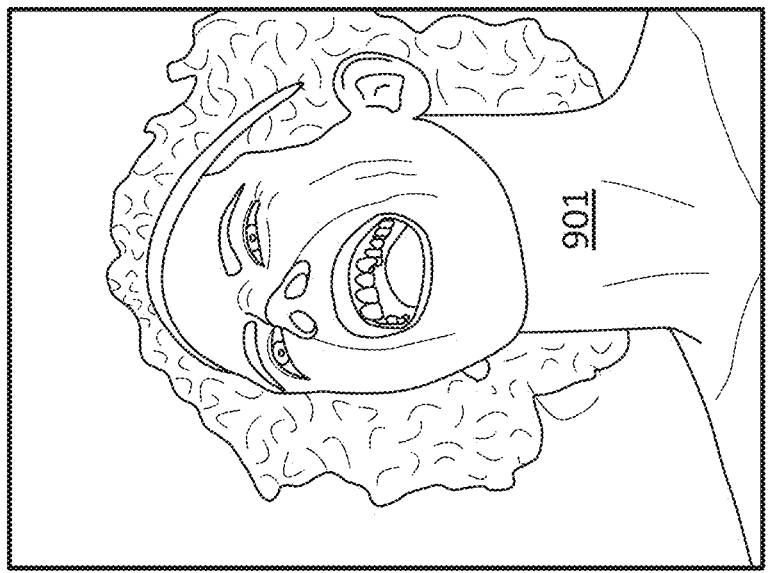

FIG. 9 illustrates the use of an opacity fade factor in an MVP model (cf. Eq. (1)), according to some embodiments. A ground truth model 901 is compared to a volumetric primitive cover 949-1 obtained with no fade factor, and a volumetric primitive cover 949-2 obtained with a fade factor.

Figure 10A:
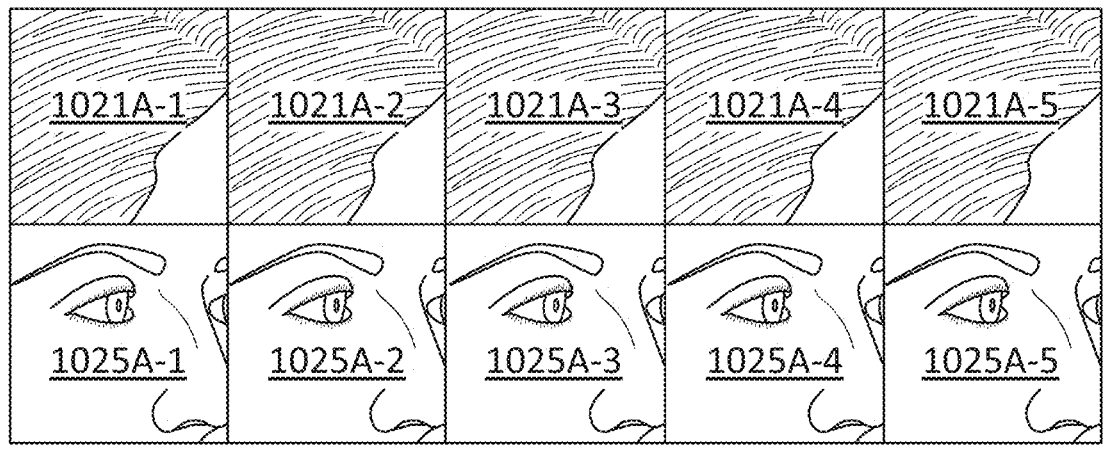
FIGS. 10A-10B illustrate examples of MVP models using different numbers of voxels per volumetric primitive, according to some embodiments.
Figure 10B:
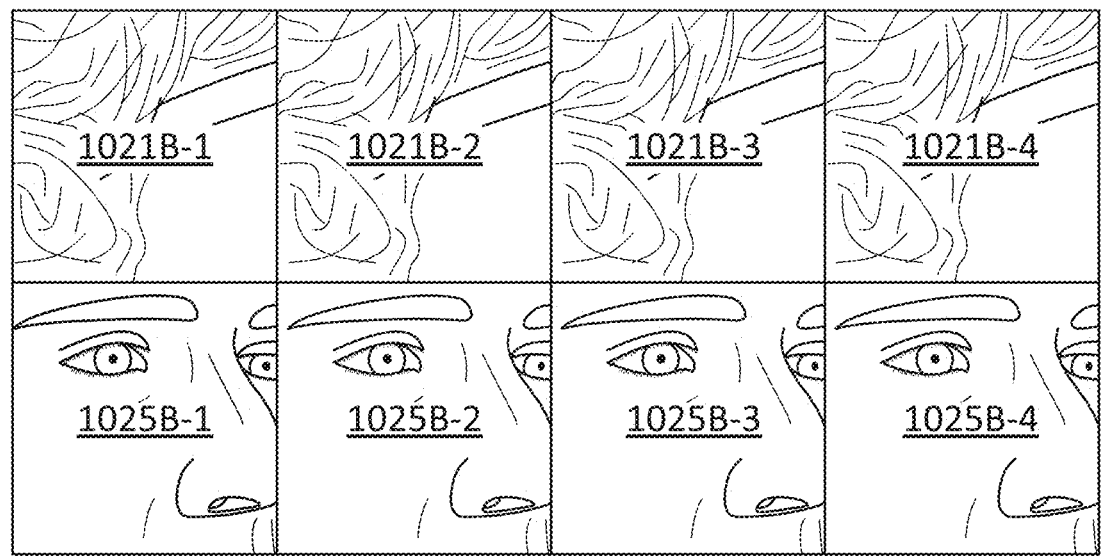

FIGS. 10A-10B illustrate examples of MVP models using different MVP models, according to some embodiments.

FIG. 10A illustrates 3D models 1021A-1, 1021A-2, 1021A-3, 1021A-4, and 1021A-5 (hereinafter, collectively referred to as "3D models 1021A"). Each of 3D models 1021A is trained and tested at a selected ray marching step-size 1025A-1 (8 mm), 1025A-2 (4 mm), 1025A-3 (2 mm), 1025A-4 (1 mm), and 1025A-5 (0.5 mm), respectively, hereinafter, collectively referred to as "step-sizes 1025A." Small step sizes 1025A are able to recover more detail, and reduce noise associated with ray marching at the cost of increased ray marching time.

FIG. 10B illustrates 3D models 1021B-1, 1021B-2, 1021B-3, and 1021B-4 (hereinafter, collectively referred to as "3D models 1021B"). Each of 3D models 1021B is trained and tested at a selected voxel number 1025B-1 (130 k), 1025B-2 (1 million), 1025B-3 (8 million), and 1025B-4 (28 million), respectively, hereinafter, collectively referred to as "voxel numbers 1025B." Voxel models of more than 8M voxels are generally too slow to run in real time on current hardware.

Figure 11:
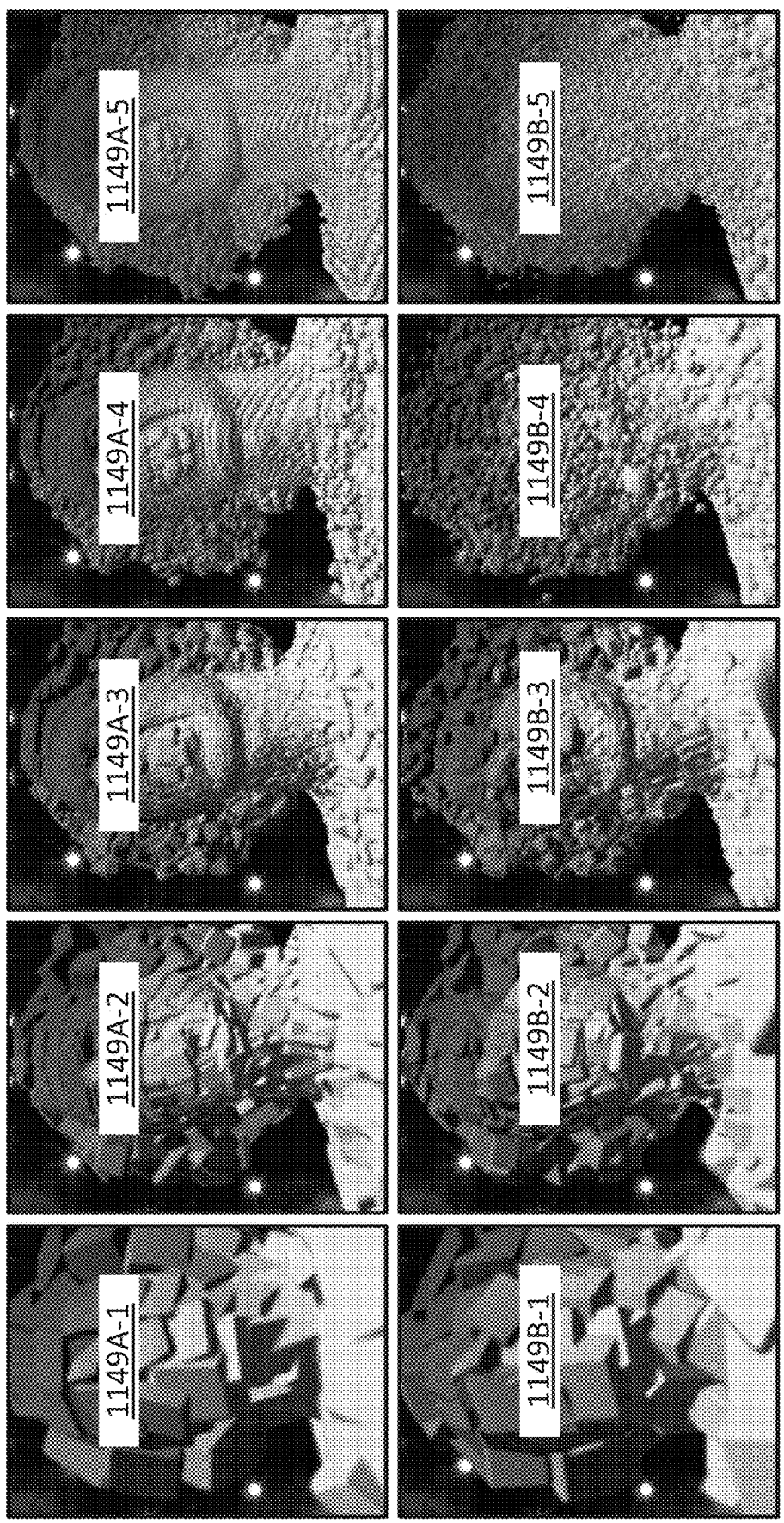
FIG. 11 illustrates different motion models incorporated in an MVP model, according to some embodiments.

FIG. 11 illustrates different motion models incorporated in an MVP model, according to some embodiments. 3D covers 1149A-1, 1149A-2, 1149A-3, 1149A-4, and 1149A-5 (hereinafter, collectively referred to as "3D covers 1149A") are obtained (64, 512, 4 k, 32 k, and 262 k volumetric primitives respectively) with an MVP model using a stack of convolutions where each output pixel contains 9 channels representing the scaling, rotation, and translation of the corresponding volumetric primitive. 3D covers 1149B-1, 1149B-2, 1149B-3, 1149B-4, and 1149B-5 (hereinafter, collectively referred to as "3D covers 1149B") are obtained (64, 512, 4 k, 32 k, and 262 k volumetric primitives respectively) with an MVP model using a linear layer from the encoding to produce $9N_{boxes}$ channels that encode the scale, rotation, and translation of all primitives. The convolutional motion model produces boxes that closely follow the underlying surface and results in better reconstruction.

Figure 12:
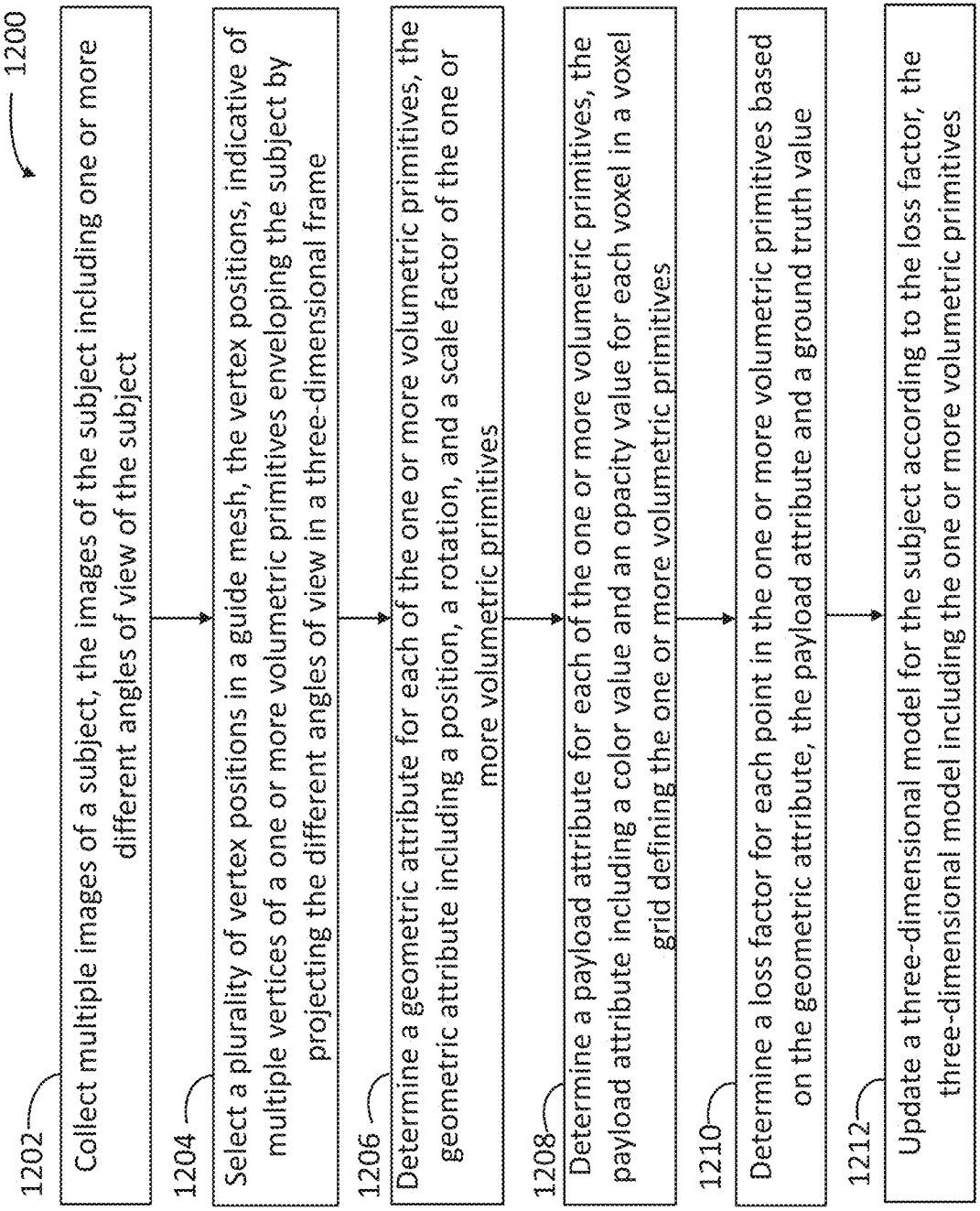
FIG. 12 illustrates a flowchart with steps in a method for training a system to render a three-dimensional model of a subject from a video capture in an immersive reality application, according to some embodiments.

FIG. 12 is a flow chart illustrating steps in a method 1200 for training a system to render a 3D model of a subject from a video capture in an immersive reality application, according to some embodiments. In some embodiments, method 1200 may be performed at least partially by a processor executing instructions in a client device or server as disclosed herein (cf. processors 212 and memories 220, client devices 110, and servers 130). In some embodiments, at least one or more of the steps in method 1200 may be performed by an application installed in a VR/AR headset, or a model training engine including an MVP model (e.g., application 222, model training engine 232, and MVP model 240). A user may interact with the application in the client device via input and output elements and a GUI, as disclosed herein (cf. input device 214, output device 216, and GUI 225). The MVP model may include a volumetric decoder, a payload decoder, a guide mesh tool, and a ray marching tool, as disclosed herein (e.g., volumetric decoder 242, payload decoder 244, guide mesh tool 246, and ray marching tool 248). In some embodiments, methods consistent with the present disclosure may include at least one or more steps in method 1200 performed in a different order, simultaneously, quasi-simultaneously, or overlapping in time.

Step 1202 includes collecting multiple images of a subject, the images from the subject including one or more different angles of view of the subject.

Step 1204 includes selecting a plurality of vertex positions in a guide mesh, indicative of multiple vertices of a one or more volumetric primitives enveloping the subject by projecting the different angles of view in a three-dimensional frame. In some embodiments, step 1204 includes selecting a constraining factor so that a volume of the one or more volumetric primitives be greater than a selected threshold. In some embodiments, step 1204 includes selecting a minimum volume value of the one or more volumetric primitives so that each point in the image of the subject is within one or more volumetric primitives. In some embodiments, the one or more volumetric primitives are minimally overlapping and dynamically moving, and step 1204 includes allowing a change in the position, the rotation, and the scale factor of the one or more volumetric primitives to reduce the loss factor.

Step 1206 includes determining a geometric attribute for each of the one or more volumetric primitives, the geometric attribute including a position, a rotation, and a scale factor of the one or more volumetric primitives.

Step 1208 includes determining a payload attribute for each of the one or more volumetric primitives, the payload attribute including a color value and an opacity value for each voxel in a voxel grid defining the one or more volumetric primitives. In some embodiments, step 1208 includes determining the color value and the opacity value for each voxel by tracing a ray of points for each volumetric primitive and accumulating three projected color values and a projected opacity value from the images of the subject along a selected point of view. In some embodiments, step 1208 includes determining an opacity fade factor to avoid opacity artifacts in overlapping volumetric primitives close to a boundary of the one or more volumetric primitives.

Step 1210 includes determining a loss factor for each point in the one or more volumetric primitives based on the geometric attribute, the payload attribute, and a ground truth value. In some embodiments, step 1210 includes determining a mesh reconstruction loss based on the vertex positions in the guide mesh and a ground truth position on a tracked mesh. In some embodiments, step 1210 includes selecting a number of volumetric primitives and a number of voxels per volumetric primitive based on the loss factor.

Step 1212 includes updating a three-dimensional model for the subject according to the loss factor, the three-dimensional model including the one or more volumetric primitives. In some embodiments, step 1212 includes interpolating the three-dimensional model between two key frames of a video capture providing the multiple images of the subject. In some embodiments, step 1212 includes forming a background model with multiple images excluding the subject, and updating the three-dimensional model for the subject includes combining the one or more volumetric primitives with the background model.

Figure 13:
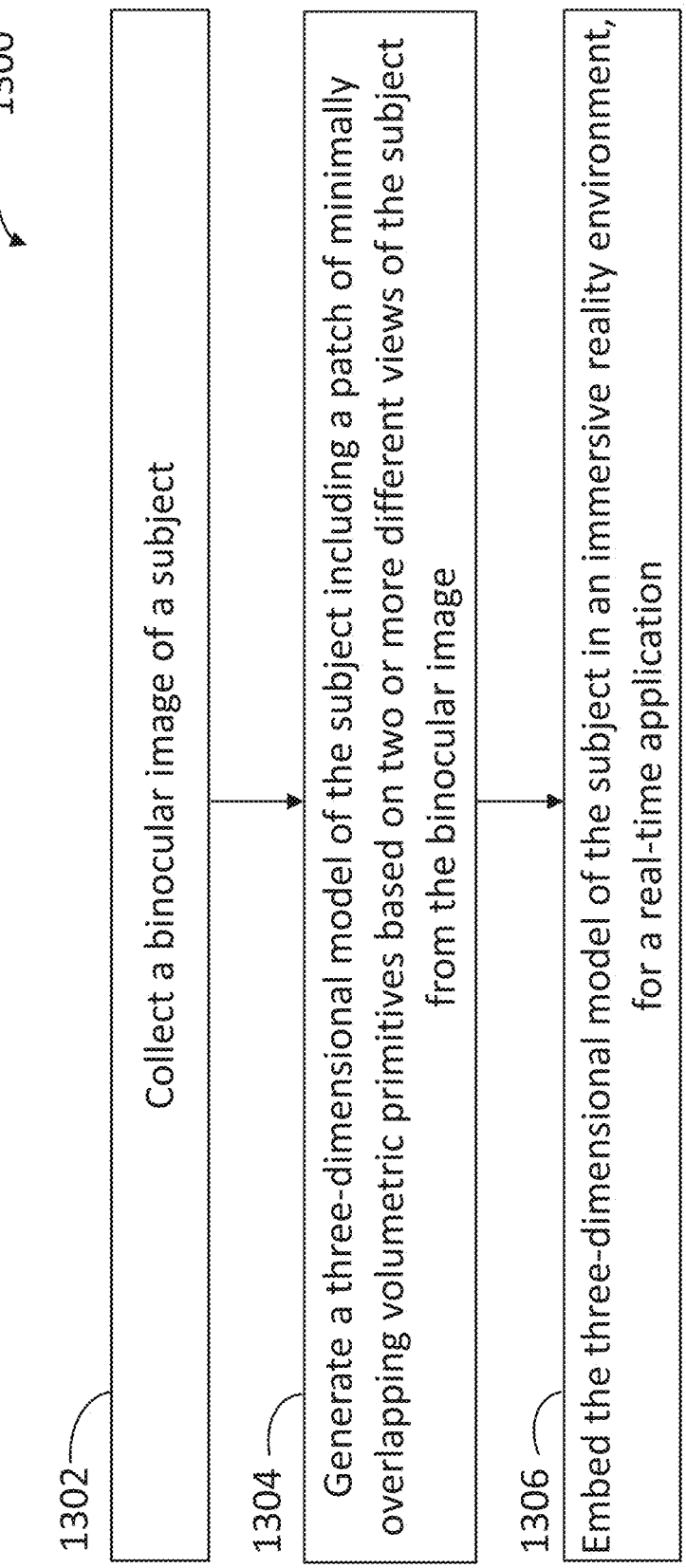
FIG. 13 illustrates a flowchart with steps in a method for rendering a three-dimensional model of a subject from a video capture in an immersive reality application, according to some embodiments.

FIG. 13 is a flow chart illustrating steps in a method 1300 for embedding a real-time, clothed subject animation in a virtual reality environment, according to some embodiments. In some embodiments, method 1300 may be performed at least partially by a processor executing instructions in a client device or server as disclosed herein (cf. processors 212 and memories 220, client devices 110, and servers 130). In some embodiments, at least one or more of the steps in method 1300 may be performed by an application installed in a VR/AR headset, or a model training engine including an MVP model (e.g., application 222, model training engine 232, and MVP model 240). A user may interact with the application in the client device via input and output elements and a GUI, as disclosed herein (cf. input device 214, output device 216, and GUI 225). The MVP model may include a volumetric decoder, a payload decoder, a guide mesh tool, and a ray marching tool, as disclosed herein (e.g., volumetric decoder 242, payload decoder 244, guide mesh tool 246, and ray marching tool 248). In some embodiments, methods consistent with the present disclosure may include at least one or more steps in method 1300 performed in a different order, simultaneously, quasi-simultaneously, or overlapping in time.

Step 1302 includes collecting a binocular image from a subject.

Step 1304 includes generating a three-dimensional model of the subject including a patch of minimally overlapping volumetric primitives based on two or more different views of the subject from the binocular image. In some embodiments, step 1304 includes adjusting a voxel count for each of the patch of minimally overlapping volumetric primitives based on a latency threshold for the real-time application.

Step 1306 includes embedding the three-dimensional model of the subject in an immersive reality environment, for a real-time application. In some embodiments, step 1306 includes animating the three-dimensional model by allowing a change in a position, a rotation, and a scale factor of one or more volumetric primitives in the patch of minimally overlapping volumetric primitives, according to a loss factor. In some embodiments, step 1306 includes convolving a translation, rotation, and scale deviation of the patch of minimally overlapping volumetric primitives with a guide mesh selected from a sequence of binocular images of the subject. In some embodiments, step 1306 includes interpolating the three-dimensional model between two key frames in a sequence of images of the subject.

Hardware Overview

Figure 14:
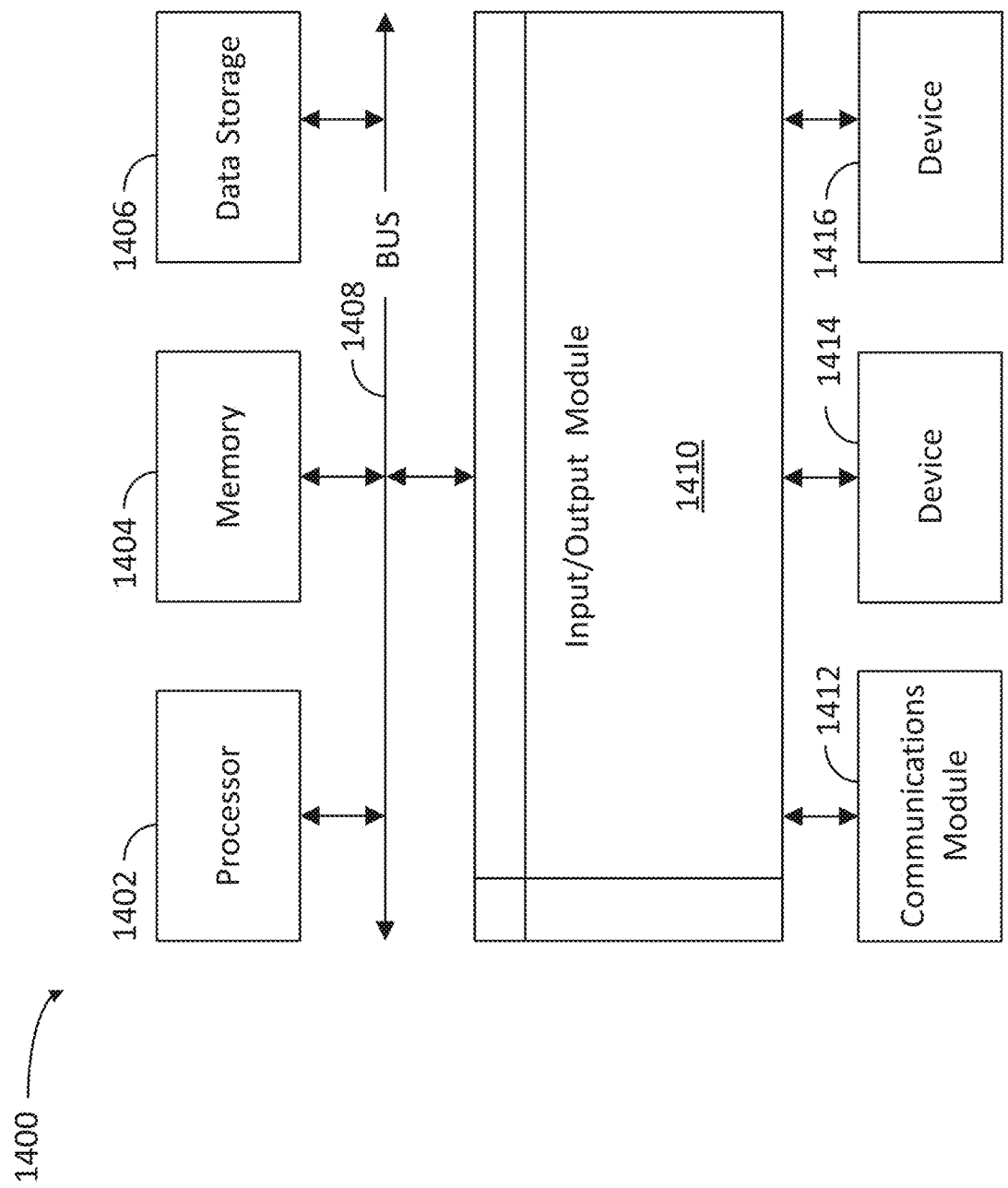
FIG. 14 is a block diagram illustrating an example computer system with which the client and server of FIGS. 1 and 2 and the methods of FIGS. 12-13 can be implemented.

FIG. 14 is a block diagram illustrating an exemplary computer system 1400 with which the client and server of FIGS. 1 and 2, and the methods of FIGS. 12 and 13 can be implemented. In certain aspects, the computer system 1400 may be implemented using hardware or a combination of software and hardware, either in a dedicated server, or integrated into another entity, or distributed across multiple entities.

Computer system 1400 (e.g., client 110 and server 130) includes a bus 1408 or other communication mechanism for communicating information, and a processor 1402 (e.g., processors 212) coupled with bus 1408 for processing information. By way of example, the computer system 1400 may be implemented with one or more processors 1402. Processor 1402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1400 can include, in addition to hardware, code that creates an execution environment for the computer program in question, e.g., code that constitutes processor firmware, a protocol stack, a database management system, an operating system, or a combination of one or more of them stored in an included memory 1404 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1408 for storing information and instructions to be executed by processor 1402. The processor 1402 and the memory 1404 can be supplemented by, or incorporated in, special purpose logic circuitry.

The instructions may be stored in the memory 1404 and implemented in one or more computer program products, e.g., one or more modules of computer program instructions encoded on a computer-readable medium for execution by, or to control the operation of, the computer system 1400, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1404 may also be used for storing temporary variable or other intermediate information during execution of instructions to be executed by processor 1402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1400 further includes a data storage device 1406 such as a magnetic disk or optical disk, coupled to bus 1408 for storing information and instructions. Computer system 1400 may be coupled via input/output module 1410 to various devices. Input/output module 1410 can be any input/output module. Exemplary input/output modules 1410 include data ports such as USB ports. The input/output module 1410 is configured to connect to a communications module 1412. Exemplary communications modules 1412 (e.g., communications modules 218) include networking interface cards, such as Ethernet cards and modems. In certain aspects, input/output module 1410 is configured to connect to a plurality of devices, such as an input device 1414 (e.g., input device 214) and/or an output device 1416 (e.g., output device 216). Exemplary input devices 1414 include a keyboard and a pointing device, e.g., a mouse or a trackball, by which a user can provide input to the computer system 1400. Other kinds of input devices 1414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1416 include display devices, such as an LCD (liquid crystal display) monitor, for displaying information to the user.

According to one aspect of the present disclosure, the client 110 and server 130 can be implemented using a computer system 1400 in response to processor 1402 executing one or more sequences of one or more instructions contained in memory 1404. Such instructions may be read into memory 1404 from another machine-readable medium, such as data storage device 1406. Execution of the sequences of instructions contained in main memory 1404 causes processor 1402 to perform the process steps described herein. One or more processors in a multi-processing arrangement may also be employed to execute the sequences of instructions contained in memory 1404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 1400 can include clients and servers. A client and server are generally remote from each other and typically interact through a communication network. The relationship of client and server arises by virtue of computer programs running on the respective computers and having a client-server relationship to each other. Computer system 1400 can be, for example, and without limitation, a desktop computer, laptop computer, or tablet computer. Computer system 1400 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1402 for execution. Such a medium may take many forms, including, but not limited to, non-volatile media, volatile media, and transmission media. Non-volatile media include, for example, optical or magnetic disks, such as data storage device 1406. Volatile media include dynamic memory, such as memory 1404. Transmission media include coaxial cables, copper wire, and fiber optics, including the wires forming bus 1408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   collecting multiple images of a subject, the images of the subject including one or more different angles of view of the subject;
   selecting a plurality of vertex positions in a guide mesh, indicative of multiple vertices of a one or more volumetric primitives enveloping the subject;
   determining a geometric attribute for each of the one or more volumetric primitives, the geometric attribute including a position, a rotation, and a scale factor of the one or more volumetric primitives;
   determining a payload attribute for each of the one or more volumetric primitives, the payload attribute including a color value and an opacity value for each voxel in a voxel grid defining the one or more volumetric primitives;
   determining a loss factor for each point in the one or more volumetric primitives based on the geometric attribute, the payload attribute and a ground truth value; and
   updating a three-dimensional model for the subject according to the loss factor, the three-dimensional model including the one or more volumetric primitives.

2. The computer-implemented method of claim 1, wherein selecting the plurality of vertex positions in the guide mesh comprises selecting a constraining factor so that a volume of the one or more volumetric primitives is greater than a selected threshold.

3. The computer-implemented method of claim 1, wherein selecting the plurality of vertex positions in the guide mesh comprises selecting a minimum volume value of the one or more volumetric primitives so that each point in the images of the subject is within the one or more volumetric primitives.

4. The computer-implemented method of claim 1, wherein the one or more volumetric primitives are minimally overlapping and dynamically moving, and determining the geometric attribute for each of the one or more volumetric primitives comprises allowing a change in the position, the rotation, and the scale factor of the one or more volumetric primitives to reduce the loss factor.

5. The computer-implemented method of claim 1, further comprising determining the color value and the opacity value for each voxel by tracing a ray of points for each of the volumetric primitives and accumulating three projected color values and a projected opacity value from the images of the subject along a selected point of view.

6. The computer-implemented method of claim 1, wherein determining the payload attribute further comprises determining an opacity fade factor to avoid opacity artifacts in overlapping volume primitives close to a boundary of the one or more volumetric primitives.

7. The computer-implemented method of claim 1, wherein determining the loss factor comprises determining a mesh reconstruction loss based on the vertex positions in the guide mesh and a ground truth position on a tracked mesh.

8. The computer-implemented method of claim 1, further comprising selecting a number of volumetric primitives and a number of voxels per volumetric primitive based on the loss factor.

9. The computer-implemented method of claim 1, further comprising interpolating the three-dimensional model between two key frames of a video capture providing the multiple images of the subject.

10. The computer-implemented method of claim 1, further comprising:
forming a background model with multiple images excluding the subject; and
updating the three-dimensional model for the subject comprises combining the one or more volumetric primitives with the background model.

11. A system, comprising:
a memory storing multiple instructions; and
one or more processors configured to execute the instructions to cause the system to:
collect multiple images of a subject, the images of the subject including one or more different angles of view of the subject;
select a plurality of vertex positions in a guide mesh, indicative of multiple vertices of a one or more volumetric primitives enveloping the subject;
determine a geometric attribute for each of the one or more volumetric primitives, the geometric attribute including a position, a rotation, and a scale factor of the one or more volumetric primitives;
determine a payload attribute for each of the one or more volumetric primitives, the payload attribute including a color value and an opacity value for each voxel in a voxel grid defining the one or more volumetric primitives;
determine a loss factor for each point in the one or more volumetric primitives based on the geometric attribute, the payload attribute and a ground truth value; and
update a three-dimensional model for the subject according to the loss factor, the three-dimensional model including the one or more volumetric primitives,
wherein to select the plurality of vertex positions in the guide mesh, the one or more processors execute instructions to select a constraining factor so that a volume of the one or more volumetric primitives is greater than a selected threshold.

12. The system of claim 11, wherein to select the plurality of vertex positions in the guide mesh, the one or more processors execute instructions to select a minimum volume value of the one or more volumetric primitives so that each point in the images of the subject is within the one or more volumetric primitives.

13. The system of claim 11, wherein the one or more volumetric primitives are minimally overlapping and dynamically moving, and to determine the geometric attribute for each of the one or more volumetric primitives, the one or more processors execute instructions to allow a change in the position, the rotation, and the scale factor of the one or more volumetric primitives to reduce the loss factor.

14. The system of claim 11, wherein the one or more processors further execute instructions to determine the color value and the opacity value for each voxel by tracing a ray of points for each of the volumetric primitives and by accumulating three projected color values and a projected opacity value from the images of the subject along a selected point of view.

15. The system of claim 11, wherein to determine the payload attribute the one or more processors execute instructions to determine an opacity fade factor to avoid opacity artifacts in overlapping volume primitives close to a boundary of the one or more volumetric primitives.

16. A computer-implemented method, comprising:
collecting a binocular image of a subject;
generating a three-dimensional model of the subject including a patch of minimally overlapping volumetric primitives based on two or more different views of the subject from the binocular image;
determining a payload attribute for one or more volumetric primitives of the three-dimensional model, the payload attribute including a color value and an opacity value for each voxel in a voxel grid defining the one or more volumetric primitives;
determining a loss factor for each point in the one or more volumetric primitives based on a geometric attribute, the payload attribute, and a ground truth value;
updating the three-dimensional model for the subject based on the loss factor; and
embedding the updated three-dimensional model of the subject in an immersive reality environment, for a real-time application.

17. The computer-implemented method of claim 16, further comprising adjusting a voxel count for each of the patch of minimally overlapping volumetric primitives based on a latency threshold for the real-time application.

18. The computer-implemented method of claim 16, wherein embedding the three-dimensional model of the subject in the immersive reality environment comprises animating the three-dimensional model by allowing a change in the geometric attribute in the patch of minimally overlapping volumetric primitives, according to the loss factor, wherein the geometric attribute includes a position, a rotation, and a scale factor of the one or more volumetric primitives.

19. The computer-implemented method of claim 16, wherein embedding the three-dimensional model of the subject in the immersive reality environment comprises convolving a translation, rotation and scale deviation of the patch of minimally overlapping volumetric primitives with a guide mesh selected from a sequence of binocular images of the subject.

20. The computer-implemented method of claim 16, wherein embedding the three-dimensional model of the subject in the immersive reality environment comprises interpolating the three-dimensional model between two key frames in a sequence of images of the subject.

* * * * *